(12) United States Patent
Ushinohama et al.

(10) Patent No.: US 12,368,807 B2
(45) Date of Patent: Jul. 22, 2025

(54) IMAGE PROCESSING APPARATUS FOR SETTING A NOTIFICATION DESTINATION USER WHEN AN IMAGE IS SHARED BY A CHAT SERVICE

(71) Applicant: CANON KABUSHIKI KAISHA, Tokyo (JP)

(72) Inventors: Takuya Ushinohama, Ibaraki (JP); Yoshihiro Tsukada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/415,259

(22) Filed: Jan. 17, 2024

(65) Prior Publication Data
US 2024/0155060 A1     May 9, 2024

Related U.S. Application Data

(63) Continuation of application No. 18/049,808, filed on Oct. 26, 2022, now Pat. No. 11,909,927, which is a (Continued)

(30) Foreign Application Priority Data

Jun. 30, 2020 (JP) .................. 2020-113359

(51) Int. Cl.
*H04N 1/00* (2006.01)
*H04L 51/046* (2022.01)
(Continued)

(52) U.S. Cl.
CPC ....... *H04N 1/00212* (2013.01); *H04L 51/046* (2013.01); *H04L 51/10* (2013.01);
(Continued)

(58) Field of Classification Search
CPC .......... H04N 1/00212; H04N 1/32085; H04N 1/2128; H04N 2201/3202; H04N 2201/3204; H04L 51/046; H04L 51/10
See application file for complete search history.

(56) References Cited

U.S. PATENT DOCUMENTS

2014/0063562 A1* 3/2014 Lee .................. H04N 1/00122
358/439

FOREIGN PATENT DOCUMENTS

JP    2019071145 A    5/2019
JP    2020052587 A    4/2020

* cited by examiner

*Primary Examiner* — Nicholas Pachol
(74) *Attorney, Agent, or Firm* — Canon U.S.A., Inc. IP Division

(57) ABSTRACT

An image processing apparatus that communicates with a chat server which controls displaying of received image data in a talk room of a chat service provided by the chat server, based on received information about the talk room, and controls transmission of a notification, based on received user information on a notification destination user, the image processing apparatus includes a reading unit configured to read an image of a document to generate image data based on the image, a registration unit configured to register the talk room of the chat service and the notification destination user in association with an object, and a transmission unit configured to transmit the image data generated by reading of the reading unit, the information about the talk room, and the user information on the communication destination user to the chat server, in response to selection of the object.

20 Claims, 18 Drawing Sheets

Related U.S. Application Data continuation of application No. 17/344,685, filed on Jun. 10, 2021, now Pat. No. 11,509,779.

(51) Int. Cl.
  *H04L 51/10* (2022.01)
  *H04N 1/32* (2006.01)

(52) U.S. Cl.
  CPC ..... *H04N 1/32085* (2013.01); *H04N 1/32128* (2013.01); *H04N 2201/3202* (2013.01); *H04N 2201/3204* (2013.01)

FIG.16

| DEVICE ID/USER ID | AUTHENTICATION INFORMATION (TOKEN) |
|---|---|
| USER 1 | XXTOKEN 1 |
| USER 2 | XXTOKEN 2 |
| USER 3 | XXTOKEN 3 |
| DEVICE 1 | XXTOKEN 4 |
| DEVICE 2 | XXTOKEN 5 |

IMAGE PROCESSING APPARATUS FOR SETTING A NOTIFICATION DESTINATION USER WHEN AN IMAGE IS SHARED BY A CHAT SERVICE

CROSS REFERENCE OF RELATED APPLICATIONS

This application is a continuation of U.S. patent application Ser. No. 18/049,808, filed on Oct. 26, 2022, which is a continuation of U.S. patent application Ser. No. 17/344,685, filed on Jun. 10, 2021 and issued as U.S. Pat. No. 11,509,779 on Nov. 22, 2022, which claims the benefit of Japanese Patent Application No. 2020-113359, filed Jun. 30, 2020, which are hereby incorporated by reference herein in their entirety.

BACKGROUND

Field of the Disclosure

The present disclosure relates to an image processing apparatus, a control method thereof, and a storage medium.

Description of the Related Art

Japanese Patent Application Laid-Open No. 2019-62353 discusses an image processing apparatus that transmits image data generated by scanning an image of a document to a file server on a network in order to share the generated image data.

When a user uses a chat service provided on the internet to display and share image data generated by scanning an image in a talk room of the chat service, there arises the following issues. For example, via the image processing apparatus discussed in Japanese Patent Application Laid-Open No. 2019-62353, which transmits generated image data to a file server using server message block (SMB) communication, the image data cannot be shared in the talk room of the chat service.

While, when image data is shared in the talk room of the chat service, the user can specify a notification destination user to be notified of the shared image data, the user has to execute an operation for specifying the talk room where the image data is shared and an operation for specifying the notification destination user. This is burdensome because the user has to separately execute the operation for specifying the talk room and the operation for specifying the notification destination user every time the user shares the image data.

SUMMARY

In consideration of the above-described issues, the present disclosure is directed to a technique of simply setting a notification destination user when image data generated by scanning an image using an image processing apparatus is shared by a chat service.

According to an aspect of the present disclosure, an image processing apparatus that communicates with a chat server which controls displaying of received image data in a talk room of a chat service provided by the chat server, based on received information about the talk room, and controls transmission of a notification, based on received user information on a notification destination user, the image processing apparatus includes a reading unit configured to read an image of a document to generate image data based on the image, a registration unit configured to register the talk room of the chat service and the notification destination user in association with an object, and a transmission unit configured to transmit the image data generated by reading of the reading unit, the information about the talk room, and the user information on the communication destination user to the chat server, in response to selection of the object.

Further features of the present disclosure will become apparent from the following description of exemplary embodiments with reference to the attached drawings.

BRIEF DESCRIPTION OF THE DRAWINGS

FIG. 16 is a table illustrating an example of association between an ID and token information.

DESCRIPTION OF THE EMBODIMENTS

Hereinafter, an exemplary embodiment embodying the present disclosure will be described with reference to the appended drawings. A configuration described in the following exemplary embodiment is merely an example, and the present disclosure is not limited to the configuration described below.

Figure 1:
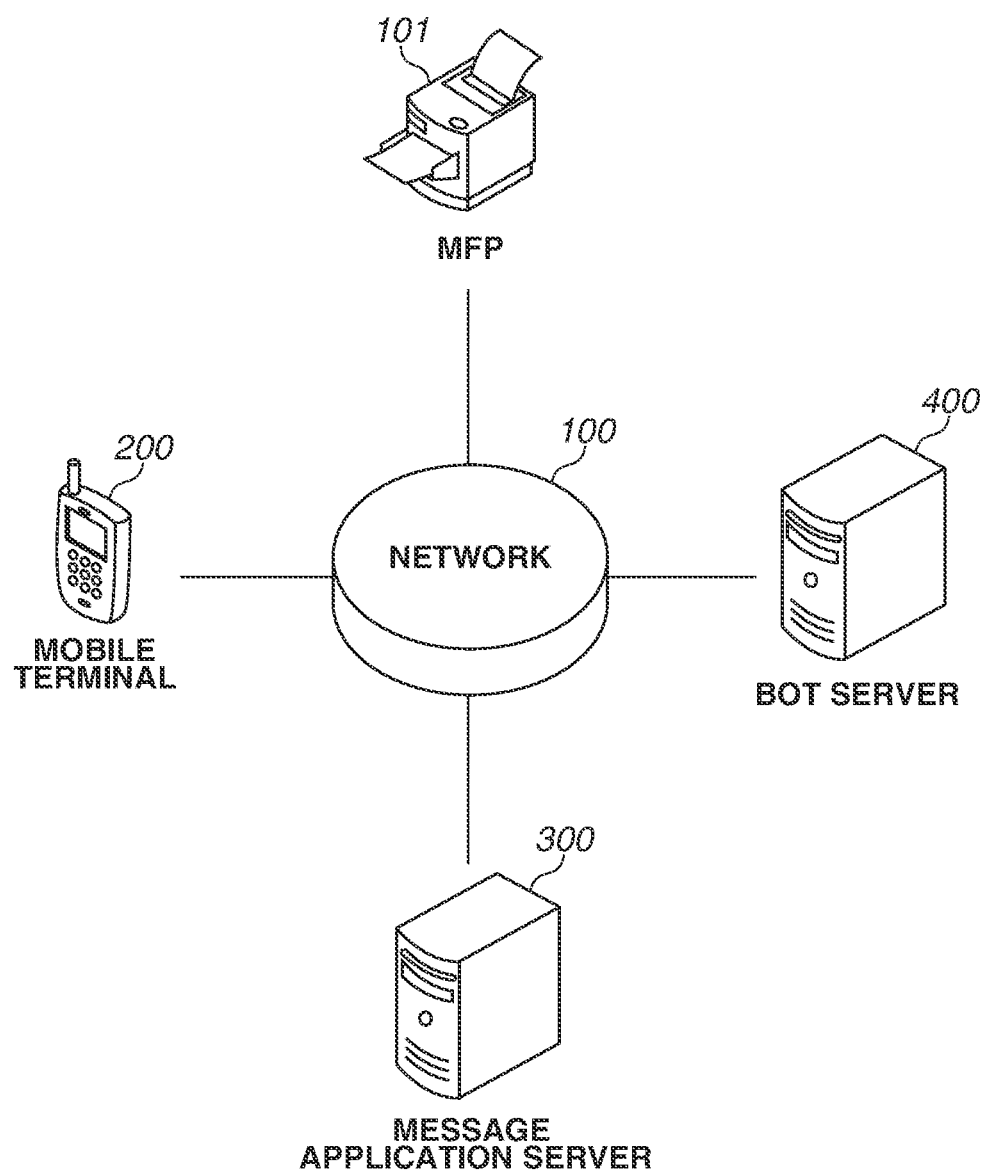
FIG. 1 is a diagram illustrating an example of a system configuration according to the present disclosure.

FIG. 1 is a diagram illustrating an example of a system configuration according to the present disclosure. A system configuration of the present exemplary embodiment is configured of a mobile terminal 200 as an example of a terminal apparatus, a multifunction peripheral (MFP) 101 as an image processing apparatus capable of executing communication via a network 100, and a message application server 300. A bot server 400 is also connected to the system via the network 100 to be capable of communicating with the other apparatuses. The message application server 300 is a chat server which manages a chat service for receiving information, such as a message and image data, transmitted from the MFP 101 or the mobile terminal 200 and displaying the received information on the mobile terminal 200 or a personal computer (PC) (not illustrated) by a user operation. The bot server 400 associates information (token information) corresponding to a bot application installed in the message application server 300 connected to the MFP 101 and transfers a request from the MFP 101 to the message application server 300. The network 100 according to the present exemplary embodiment may be the internet or a local area network (LAN). The network 100 may be a wired or wireless network.

Figure 2:
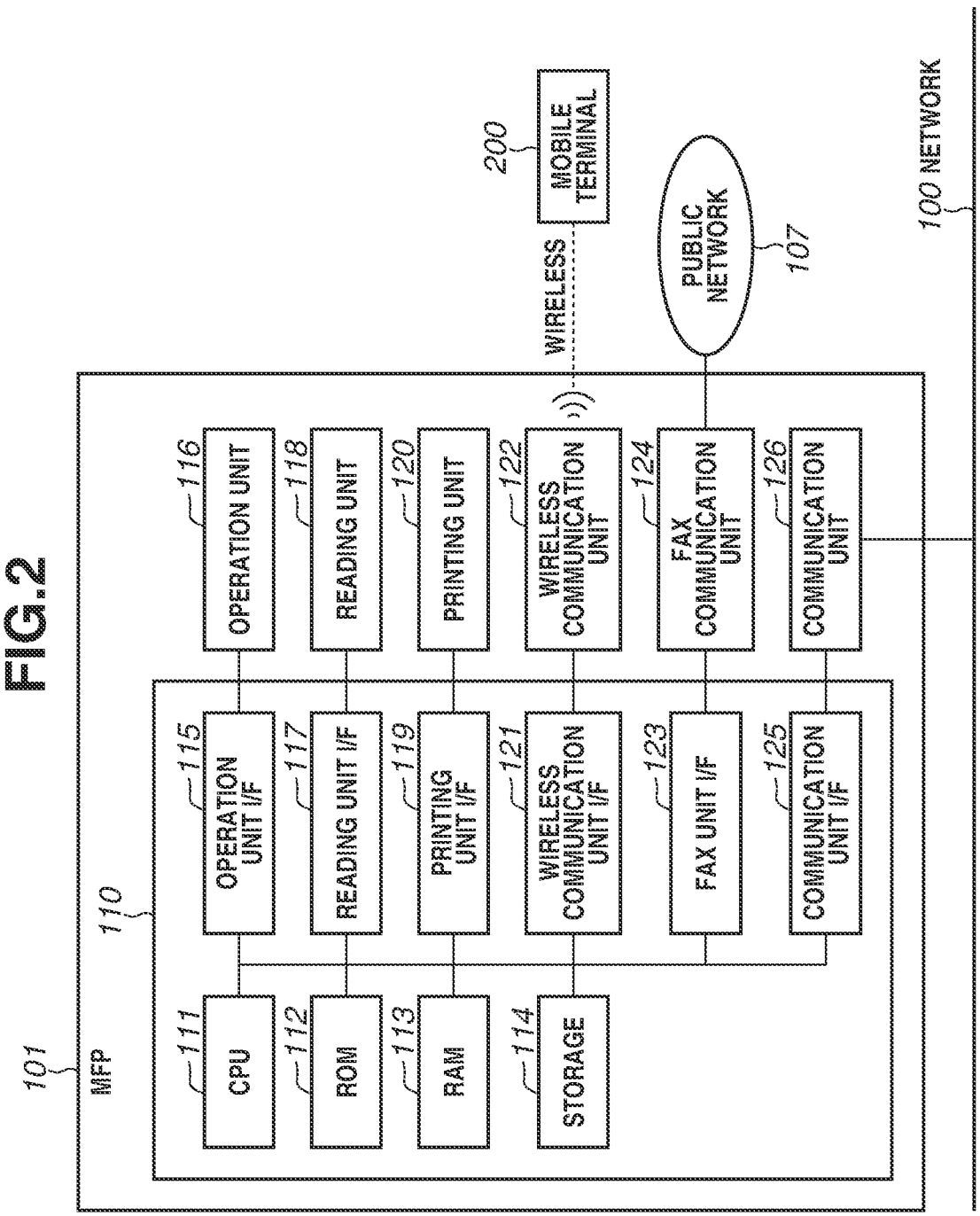
FIG. 2 is a block diagram illustrating an example of a hardware configuration of a multifunction peripheral (MFP).

FIG. 2 is a block diagram illustrating an example of a hardware configuration of the MFP 101. The MFP 101 includes a central processing unit (CPU) 111, a read only memory (ROM) 112, a random access memory (RAM) 113, a storage 114, an operation unit interface (I/F) 115, an operation unit 116, a reading unit I/F 117, a reading unit 118, a printing unit I/F 119, a printing unit 120, a wireless communication unit I/F 121, and a wireless communication unit 122. The MFP 101 further includes a FAX unit I/F 123, a FAX communication unit 124, a communication unit I/F 125, and a communication unit 126.

A control unit 110 that includes the CPU 111 controls the overall operation of the MFP 101. The CPU 111 reads a control program stored in the ROM 112 or the storage 114 to the RAM 113 and executes various types of control, such as reading control and printing control. The ROM 112 stores a control program executable by the CPU 111. The ROM 112 also stores a boot program and font data. The RAM 113 is a main storage memory that is used as a work area or a temporary storage area for loading various control programs stored in the ROM 112 and the storage 114. The storage 114 stores image data, print data, various programs, and various types of setting information. While, in the present exemplary embodiment, a flash memory is used as the storage 114, an auxiliary storage device, such as a solid state drive (SSD) or a hard disk drive (HDD), can also be used as the storage 114. An embedded multimedia card (eMMC) can also be used as the storage 114.

In the MFP 101 according to the present exemplary embodiment, one CPU 111 uses one memory (i.e., RAM 113) to execute various types of processing illustrated in the below-described flowcharts. However, the configuration is not limited thereto. For example, a plurality of CPUs, RAMs, ROMs, and storages can cooperatively execute the respective pieces of processing illustrated in the flowcharts described below. Further, a part of the processing may be executed by a hardware circuit, such as an application specific integrated circuit (ASIC) or a field programmable gate array (FPGA).

The operation unit I/F 115 connects the operation unit 116, having a display unit, such as a touch panel, and hardware keys, to the control unit 110. The operation unit 116 displays information to the user and detects an input from the user.

The reading unit I/F 117 connects the reading unit 118, such as a scanner, to the control unit 110. The reading unit 118 reads an image of a document, and the CPU 111 converts the image into image data, such as binary data. Image data generated based on the image read by the reading unit 118 is transmitted to an external apparatus or printed on a recording sheet.

The printing unit I/F 119 connects the printing unit 120, such as a printer, to the control unit 110. The CPU 111 transfers image data (print data) stored in the RAM 113 to the printing unit 120 via the printing unit I/F 119. The printing unit 120 prints an image on a recording sheet fed from a sheet feeding cassette, based on the transferred image data.

The wireless communication unit I/F 121 is an interface for controlling the wireless communication unit 122 and wirelessly connects the control unit 110 to an external wireless apparatus (herein, the mobile terminal 200).

The control unit 110 is connected to a public network 107 by the FAX unit I/F 123 controlling the FAX communication unit 124, such as a facsimile. The FAX unit I/F 123 is an interface for controlling the FAX communication unit 124. The FAX unit I/F 123 can connect the FAX communication unit 124 to the public network 107 and control a facsimile communication protocol by controlling a modem or a network control unit (NCU) for facsimile communication.

The communication unit I/F 125 connects the control unit 110 to the network 100. The communication unit I/F 125 controls the communication unit 126 to transmit image data and various types of internal information about the MFP 101 to an external apparatus connected to the network 100, and to receive print data and information available on the network 100 from an information processing apparatus connected to the network 100. As a method of transmission/reception via the network 100, the MFP 101 can perform transmission/reception using an e-mail or file transmission using the other protocols (e.g., File Transfer Protocol (FTP), SMB, and Web-based Distributed Authoring and Versioning (WEBDAV)). Further, the MFP 101 can transmit and receive image data and various types of setting data via the network 100 by access from the mobile terminal 200, the message application server 300, and the bot server 400 using HyperText Transfer Protocol (HTTP) communication.

Figure 3:
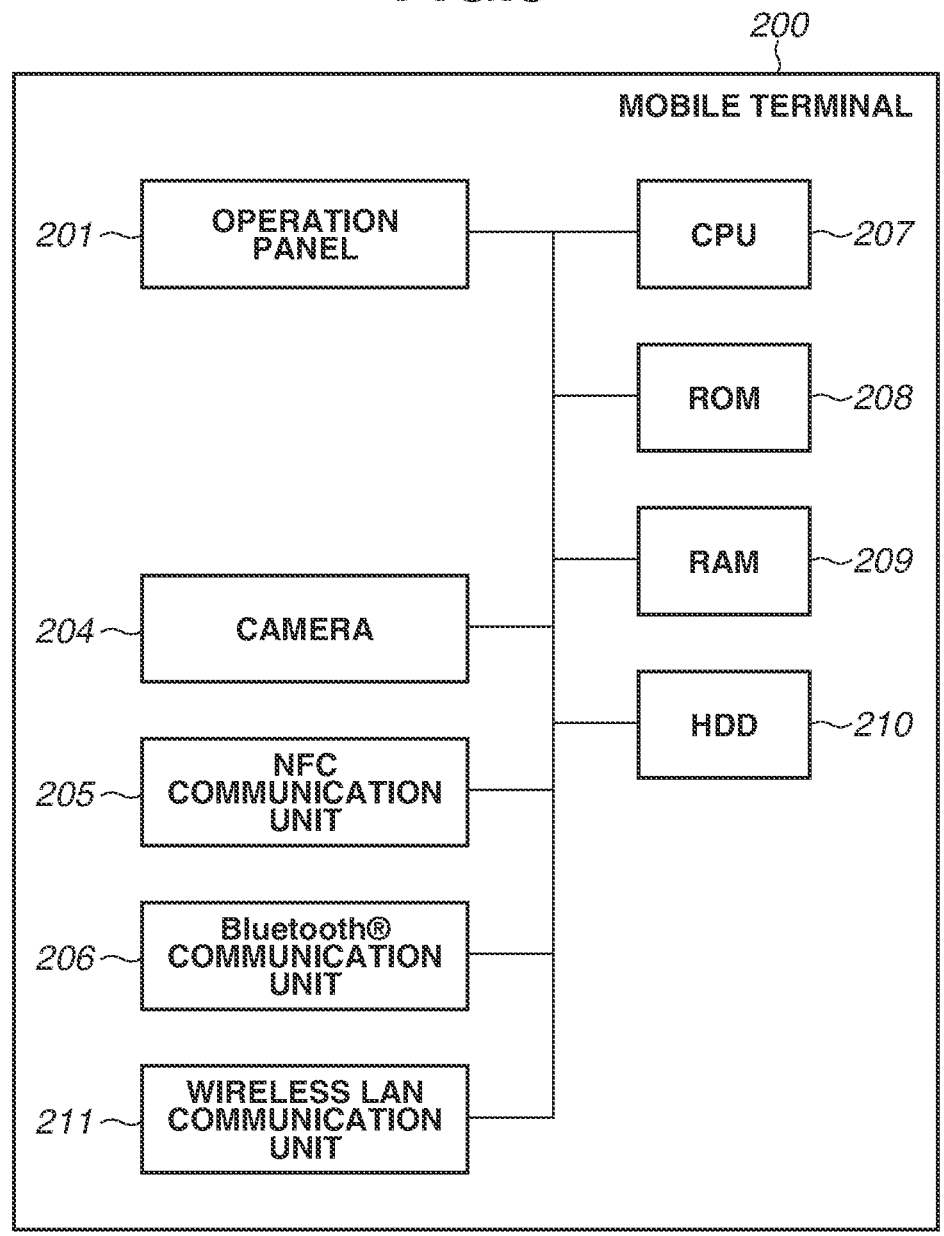
FIG. 3 is a block diagram illustrating an example of a hardware configuration of a mobile terminal.

FIG. 3 is a block diagram illustrating an example of a hardware configuration of the mobile terminal 200. While, in the present exemplary embodiment, the mobile terminal 200 is an apparatus, such as a smartphone or a tablet PC, the mobile terminal 200 may be another information processing apparatus capable of executing Wi-Fi communication.

A CPU 207 reads a control program stored in a ROM 208 and executes various types of processing for controlling an operation of the mobile terminal 200. The ROM 208 stores a control program. A RAM 209 is used as a temporary storage area, such as a main memory or a work area of the CPU 207. An HDD 210 stores various types of data, such as photographs and electronic documents.

An operation panel 201 has a touch panel function for detecting a touch operation performed by the user, and displays various screens provided by an operating system (OS) and an e-mail transmission application. The operation panel 201 is also used by the user to check the information stored in the message application server 300. The user can input a desired operation instruction to the mobile terminal 200 by performing a touch operation on the operation panel 201. The mobile terminal 200 includes a hardware key (not illustrated), and the user can input an operation instruction to the mobile terminal 200 by using the hardware key.

A camera 204 captures an image according to an image-capturing instruction from the user. A picture captured by the camera 204 is stored in a predetermined area in the HDD 210. Information can be acquired from a quick response (QR) code (registered trademark) read by the camera 204 using a program for analyzing the QR code.

The mobile terminal 200 can transmit and receive data to/from various peripheral devices via a near field communication (NFC) unit 205, a Bluetooth® communication unit 206, and a wireless LAN communication unit 211. The Bluetooth® communication unit 206 of the mobile terminal 200 may support the Bluetooth® Low Energy.

Figure 4:
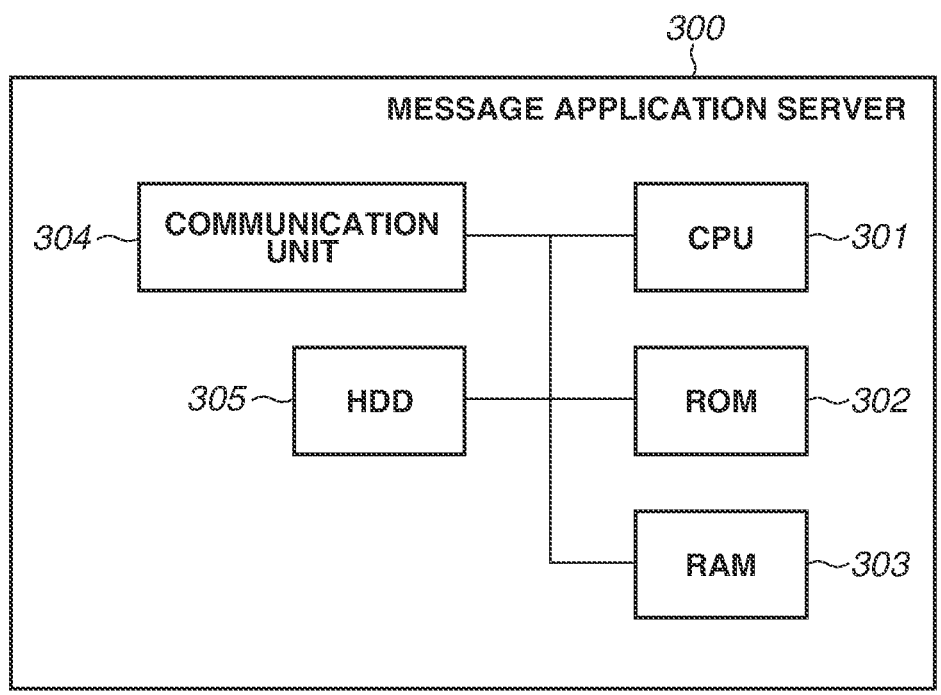
FIG. 4 is a block diagram illustrating an example of a hardware configuration of a message application server.

FIG. 4 is a block diagram illustrating an example of a hardware configuration of the message application server 300. A CPU 301 reads a control program stored in a ROM 302 and executes various types of processing for controlling an operation of the message application server 300 serving as a chat server. The ROM 302 stores a control program. A RAM 303 is used as a temporary storage area, such as a main memory or a work area, of the CPU 301. An HDD 305 stores various types of data, such as messages, images, and channel information. The message application server 300 can transmit and receive data to/from various devices, such as the mobile terminal 200 and the MFP 101, via a communication unit 304. In addition, the communication unit 304 may execute wired communication using the Ethernet (registered trademark) or wireless communication, such as Wi-Fi communication.

Figure 5:
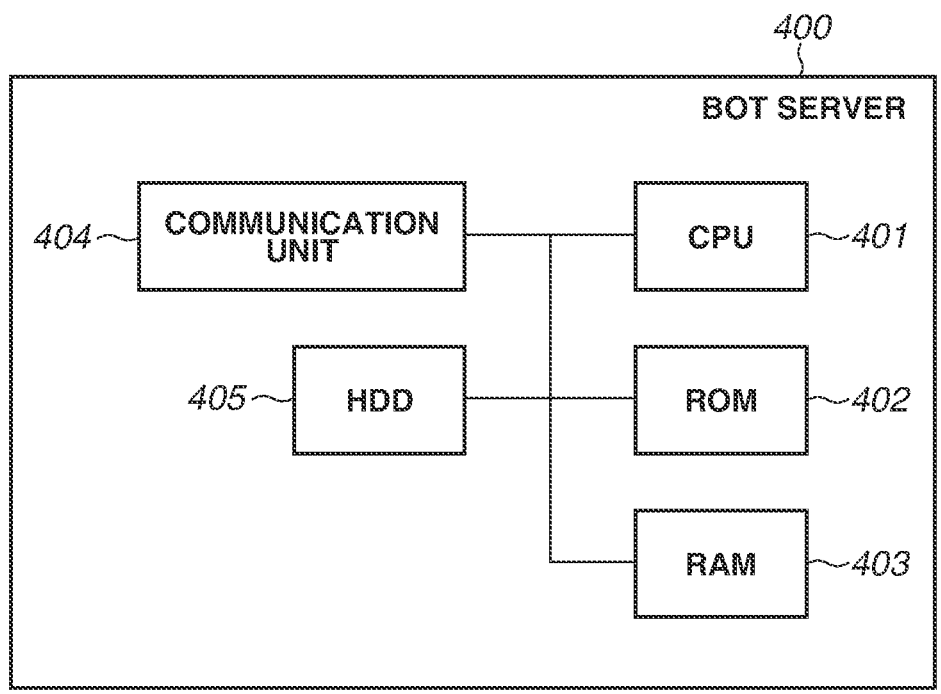
FIG. 5 is a block diagram illustrating an example of a hardware configuration of a bot server.

FIG. 5 is a block diagram illustrating an example of a hardware configuration of the bot server 400. A CPU 401 reads a control program stored in a ROM 402 and executes various types of processing for controlling the operation of the bot server 400. The ROM 402 stores a control program. A RAM 403 is used as a temporary storage area, such as a main memory or a work area, of the CPU 401. An HDD 405 stores various types of data, such as messages, image data, and channel information. The bot server 400 can transmit and receive data to/from various devices, such as the mobile terminal 200, the MFP 101, and the message application server 300, via a communication unit 404.

Figure 14:
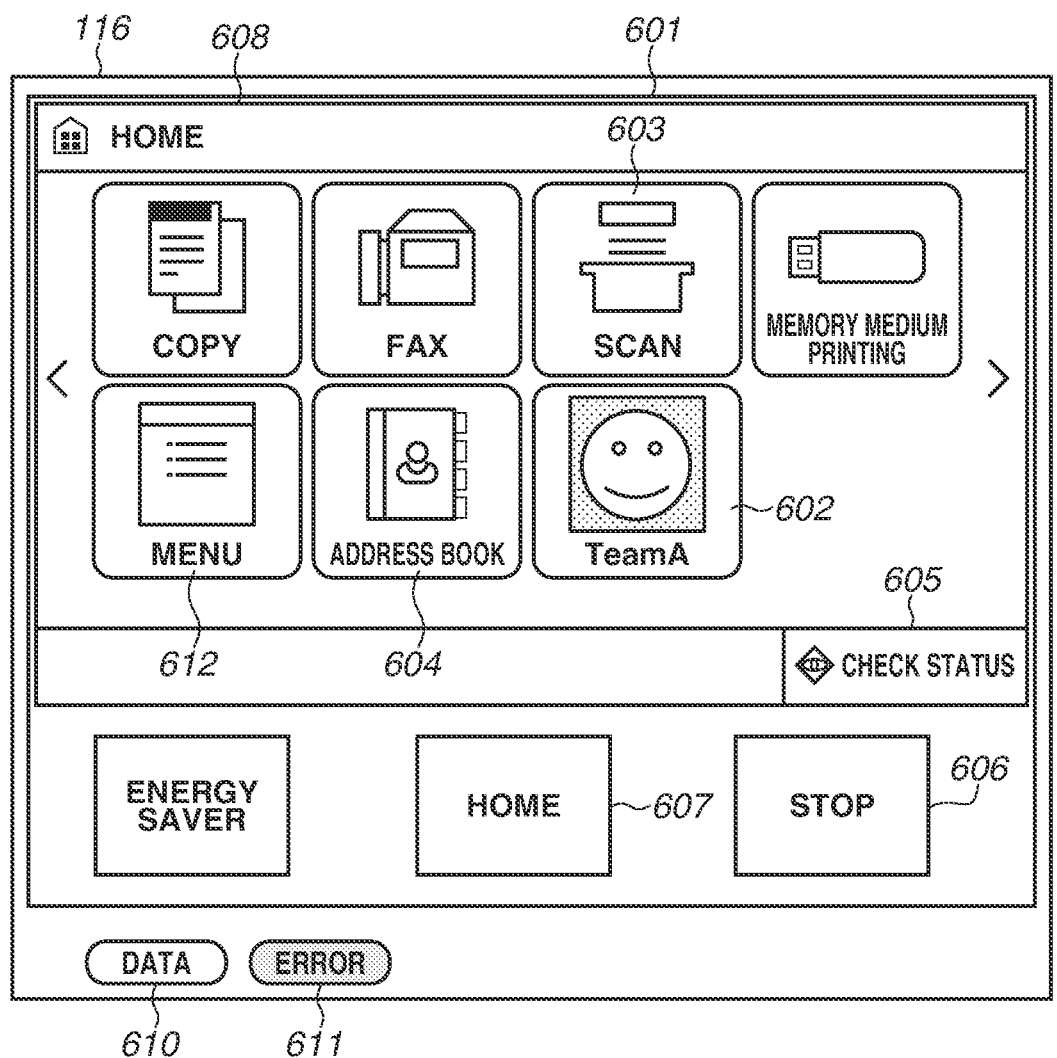
FIG. 14 is a diagram illustrating an example of a home screen displayed on an operation unit of the MFP.

FIG. 14 is a diagram illustrating an example of a home screen displayed on the operation unit 116 of the MFP 101. The operation unit 116 is configured of a touch panel 601 for displaying an operation screen and light-emitting diodes (LEDs) 610 and 611. The touch panel 601 functions as an instruction unit, an acceptance unit for accepting a user instruction, and a display unit for displaying a screen. The user directly touches a screen displayed on the touch panel 601 with a finger or a stylus to input an execution instruction of a function displayed on the screen.

The touch panel 601 in FIG. 14 displays a home screen 608. The home screen 608 is an initial screen for inputting execution instructions of the functions provided by the MFP 101. On the home screen 608, the user selects and displays screens for executing various settings of the functions that are executed by the MFP 101, e.g., copying, fax transmission, scanning, and media printing.

A check status button 605 is an object for displaying a screen (status check screen) for checking a status of the MFP 101. On the status check screen (not illustrated), the user can display a transmission history and a job execution history.

Figure 15A:
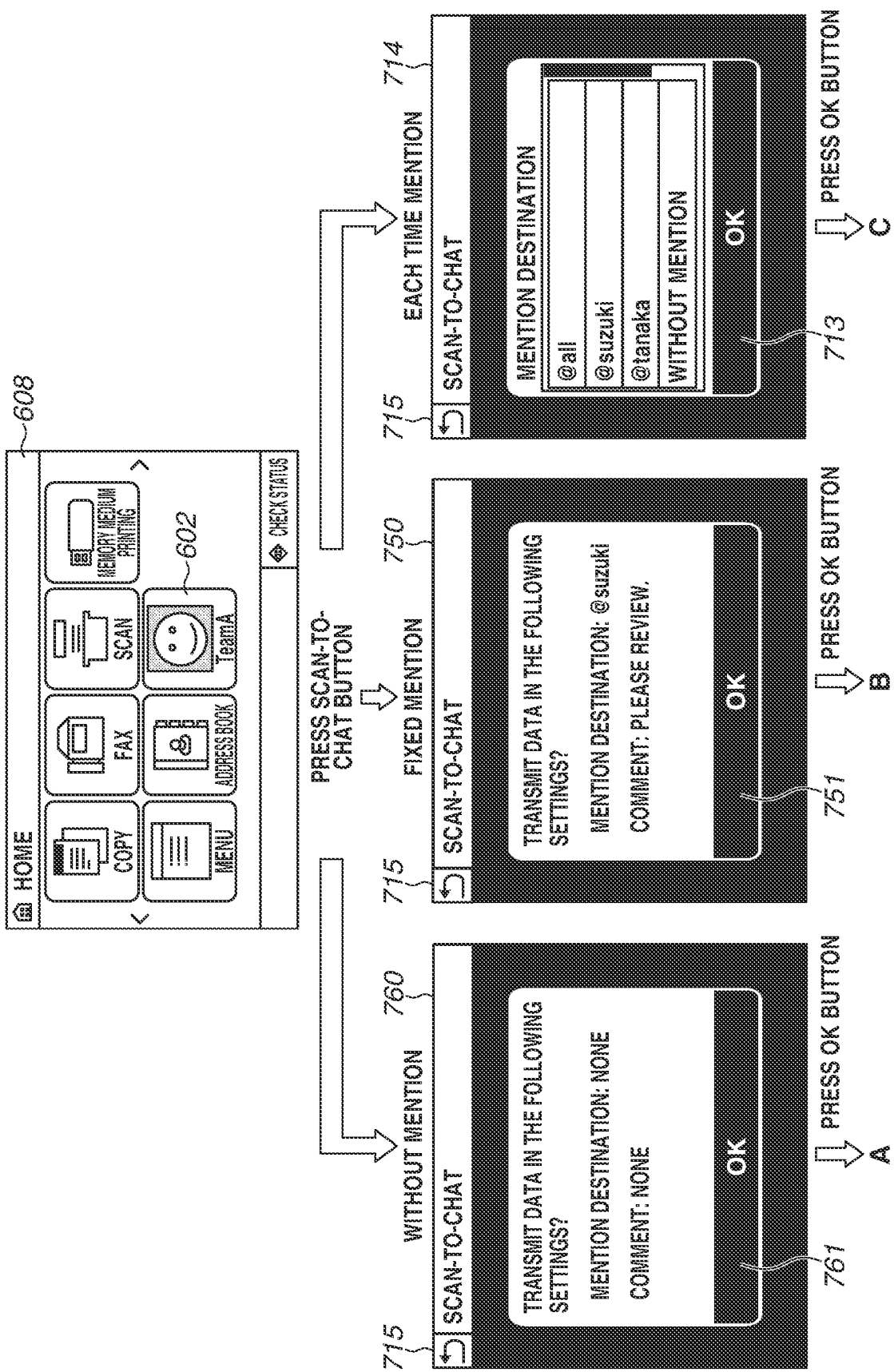
FIGS. 15A and 15B are diagrams illustrating an example of shifting of screens in the scan-to-chat processing.

A Team A button 602 is an object, named and registered as "Team A" by the user, that functions as a scan-to-chat button for transmitting scanned image data to a chat service. Hereinafter, the Team A button 602 will be described as a scan-to-chat button 602. When the user selects the scan-to-chat button 602, a screen illustrated in FIG. 15A is displayed on the operation unit 116. Registration and setting of the scan-to-chat button 602 to the home screen 608 and execution processing of the scan-to-chat button 602 will be described with reference to FIGS. 17, 15A and 15B.

A scan button 603 in FIG. 14 is an object for display a scan selection screen (not illustrated). From the scan selection screen, the user selects a transmission function, such as an e-mail transmission function, a file transmission function using SMB, FTP, or HTTP, or an internet fax (I-fax) transmission function. The user can display a setting screen of each transmission function by touching a displayed object representing the transmission function.

An address book button 604 is an object for displaying an address book screen of the MFP 101 by a user's selection operation. The LEDs 610 and 611 notify the user of a status of the MFP 101. The LED 610 is lit up when an e-mail is received or a print job is being executed, and the LED 611 is lit up when an error of some kind occurs in the MFP 101. Cancellation of various types of operation can be executed by a stop button 606. The stop button 606 is an object always displayed on the operation unit 116. A home button 607 is an object for displaying the home screen 608 and is always displayed on the operation unit 116. A menu button 612 is an object for displaying a screen on which the user performs an environmental setting, such as a use language setting and various function settings.

Figure 6:
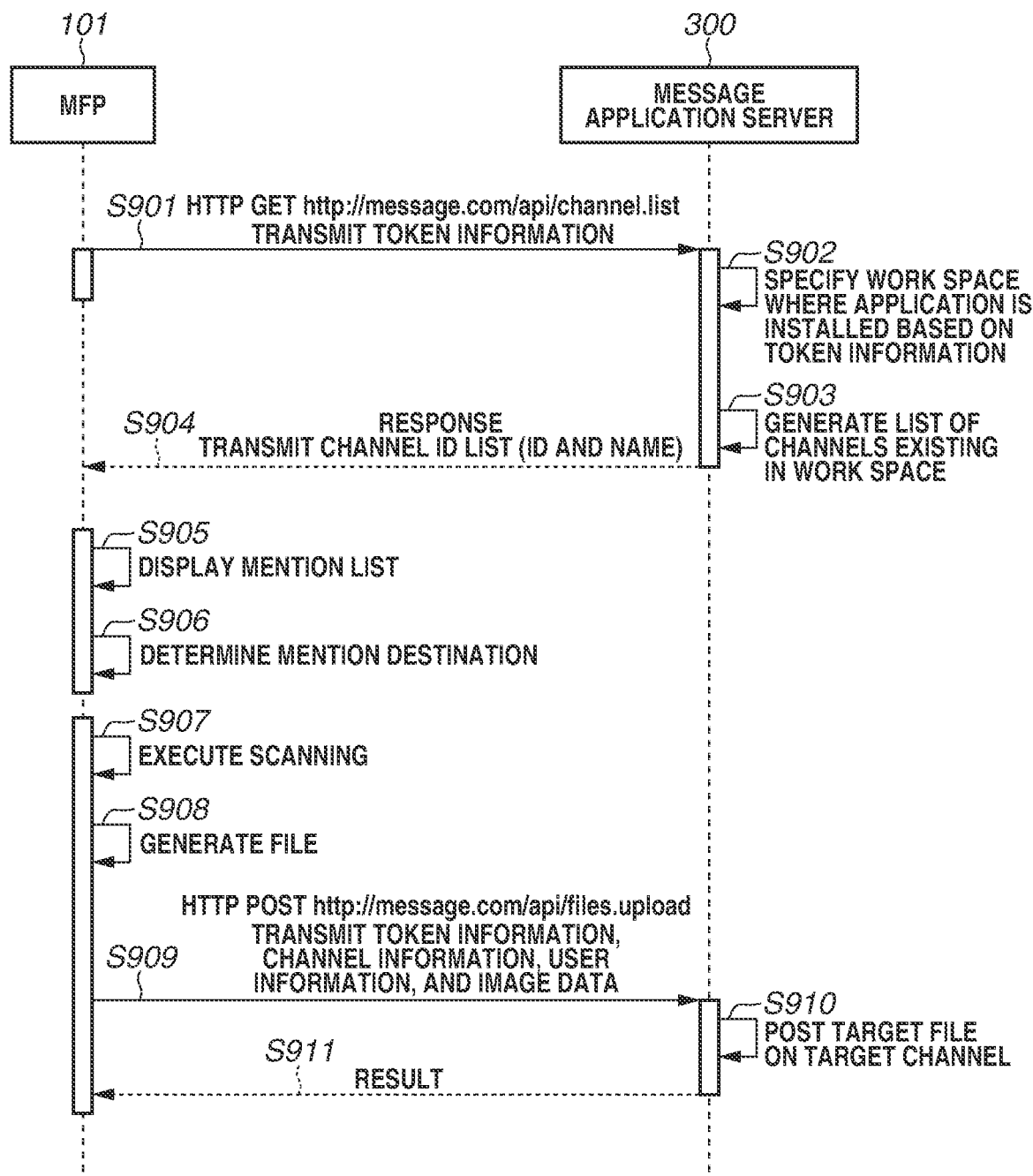
FIG. 6 is a sequence diagram illustrating an example of processing for transmitting a file generated by the MFP scanning a document to the message application server.

FIG. 6 is a sequence diagram illustrating an example of processing for transmitting a file generated by the MFP 101 by scanning a document to the message application server 300. The processing illustrated in the sequence diagram in FIG. 6 is started when the scan-to-chat button 602 in FIG. 14 is selected.

In step S901, the CPU 111 of the MFP 101 controls the communication unit 126 to transmit a request of channel list information to the message application server 300 by using HTTP communication. Specifically, the CPU 111 transmits token information input to the MFP 101 and information about a request of the channel list within the workspace indicated by the token information to the message application server 300. The token information is input by the user via a setting registration screen 1501 in FIG. 13 or a setting registration screen 1701 in FIG. 17 displayed on the operation unit 116 of the MFP 101. In FIG. 6, "HTTP GET https://message.com/api/channels.list" is an example of the command transmitted thereto. A uniform resource locator (URL) "https://message.com/api/channels.list" described in this command is a URL for accessing the message application server 300. When the token information is transmitted to this URL, the message application server 300 searches for a workspace and a bot application corresponding to the token information.

Herein, the workspace serves as an organization existing in the message application where a plurality of users belongs to. The channel serves as a chatroom in the workspace. The chatroom is a method that enables the users participating in the chatroom to mutually exchange messages as if they have conversation with each other. While, in the present exemplary embodiment, a channel is described as a chatroom, the configuration is not limited to the above, and any method can be used as long as a plurality of users can exchange messages as if they have conversation with each other. For example, this method can be a group chat, a room, a talk room, or a group. In the room, a message is not always required, and thus the method can be for merely exchanging image data.

The bot application is an application for registering the MFP 101 as a user of the message application and posting a message and image data. The bot application is installed in the message application server 300. When the user specifies the bot application and transmits image data to the message application server 300, the bot application posts the transmitted image data via the message application. A token is stored in the HDD 305 of the message application server 300 in association with the bot application, and the bot application is associated with a workspace. Thus, when the message application server 300 receives token information from the MFP 101, the message application server 300 can return information about a workspace associated with the bot application associated with the received token information. The token information, the bot application, and the workspace may be associated with each other directly. With this configuration, a workspace associated with the pre-registered token information (i.e., a workspace to which the user intends to transmit image data) can be selected from among a plurality of workspaces.

In step S902, the CPU 301 of the message application server 300 refers to the token information received via the communication unit 304 to search the HDD 305 for the workspace information and the bot application included in the token information.

In step S903, the CPU 301 of the message application server 300 checks whether access to the URL is permitted, based on the token information received from the MFP 101 via the communication unit 304. In a case where the access is permitted, the CPU 301 generates information about a list of channels belonging to the work space. The information about a list of channels is information about an array of channel information. The channel information includes a channel ID, a name of the channel, information about users participating in the channel who can be specified as mention users (i.e., information about a list of mention users), and a channel setting value indicating whether the channel is an archive channel.

Herein, "mention" refers to information indicating to whom a comment or image data the user has posted in the chat service, and the mention is expressed in a form of "@user name" in the chat screen of the chat service. A user specified in the mention is notified of information indicating a comment or image data attention to that user has been posted. The notification is transmitted to only a user specified in the mention. The mention can be specified not only by a user but also by a group, a team, or a channel where a plurality of users belong to. In this case, the notification is transmitted to all of the users belonging to the specified group. The mention user is a notification destination user of a comment or image data.

In step S904, in response to the request received by HTTP communication, the CPU 301 of the message application server 300 controls the communication unit 304 to transmit channel list information to the MFP 101. The MFP 101 determines whether channel information indicating the channel set in the setting registration screen 1701 is included in the received channel list information. In a case where the set channel information is not included, the MFP 101 displays an error screen on the operation unit 116 without executing scanning.

In step S905, based on the user list included in the received channel list information, the CPU 111 of the MFP 101 generates a mention destination selection screen 714 for selecting a mention target user.

In step S906, a mention target user is selected in the mention destination selection screen 714, and thus the CPU 111 of the MFP 101 determines the user information indicating the mention target user. Herein, the user information is an ID (user ID) of a user account managed by the message application service.

Figure 17:
FIG. 17 is a diagram illustrating an example of a setting registration screen.

The processing in steps S905 and S906 is executed in a case where an each time mention mode is set to a mention user selection field 1721 of the setting registration screen 1701 in FIG. 17, and the processing is not executed in a case where a fixed-mention mode or a without-mention mode is set thereto. The each time mention mode and the fixed mention mode will be described below.

In step S907, the CPU 111 of the MFP 101 executes scanning according to the scan setting (reading setting) registered in association with the scan-to-chat button 602. This scan setting is set in the setting registration screen 1701.

In step S908, based on the scanned image, the CPU 111 of the MFP 101 generates image data of a format set by the scan setting.

In step S909, the CPU 111 of the MFP 101 transmits various types of information to the message application server 300 via the communication unit 126 by using HTTP communication. The various types of information include token information which is the same as the token information transmitted in step S901, user information indicating the user selected as a mention target in step S906, channel information indicating the channel set in the setting registration screen 1701, and the image data generated in step S908.

The pieces of information (token information, channel information, and user information) are transmitted together with information indicating types of information. For example, information "channel:channelA" is transmitted for the channel information "channelA", and information "user: userB" is transmitted for the user information "userB".

User information of the user set in the mention user selection field 1721 of the setting registration screen 1701 in FIG. 17 is transmitted when the mention setting is the fixed mention mode. The user information is not transmitted when the mention setting is the without mention mode.

A file format which has been specified by the user in a scan-to-chat detailed setting screen is used.

In step S910, the CPU 301 of the message application server 300 searches for registered workspace information and application information which are associated with the token information received in step S909, and stores the received image data and a channel specified by the received channel information in association with each other. In a case where a mention target user is set, the CPU 301 further stores the mention information in association with the received image data and the channel. By the above-described processing, when the user starts the message application on the mobile terminal 200 and specifies a channel to check the content of conversation exchanged in the channel, a screen which displays the posted image data is displayed. By receiving the user information, the CPU 301 notifies the user indicated by the user information that the image data has been posted. An example of the screen actually displayed on the screen when the user starts the message application on the mobile terminal 200 will be described below with reference to FIG. 12.

In step S911, in response to the information received by HTTP communication, the CPU 301 of the message application server 300 transmits a result indicating success or failure in posting to the MFP 101. The CPU 111 of the MFP 101 may display a notification indicating success in posting on the operation unit 116 in a case where the posting has succeeded. The CPU 111 of the MFP 101 may display a notification indicating failure in posting on the operation unit 116 in a case where the posting has failed. The CPU 111 may display a notification indicating failure only in a case where the posting has failed, and may display no notification in a case where the posting has succeeded.

A setting registration screen for registering the scan-to-chat button 602 will be described with reference to FIG. 13.

Figure 13:
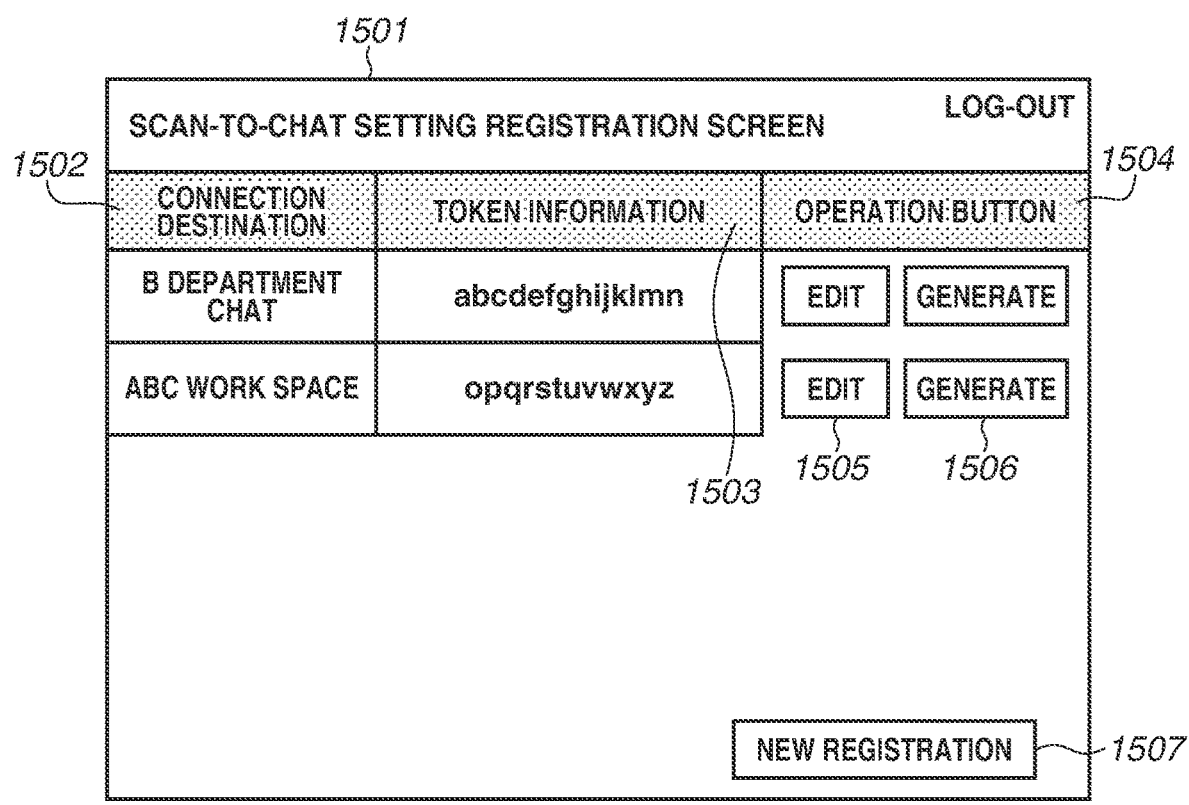
FIG. 13 is a diagram illustrating an example of a scan-to-chat setting registration screen.

FIG. 13 is a diagram illustrating an example of a scan-to-chat setting registration screen. The setting registration screen 1501 is displayed on the operation unit 116 of the MFP 101. The setting registration screen 1501 may be displayed as a web page on an operation unit of an information processing apparatus, such as a PC, connected to the MFP 101 via the network. The content registered via the setting registration screen 1501 is stored in the storage 114 in the first exemplary embodiment, and the content is stored in the HDD 405 in the second exemplary embodiment.

A connection destination 1502 is a column displaying an organization information of a connection destination. A token information 1503 is a column displaying registered token information. An operation button 1504 is a column displaying operation buttons. An edit button 1505 and a generate button 1506 are displayed on this column.

In a case where the edit button 1505 or a new registration button 1507 is selected, the setting registration screen 1701 in FIG. 17 is displayed.

A connection destination input filed 1710 and a token information input field 1711 are displayed on the setting registration screen 1701 in FIG. 17, and the user can input or change the setting content by using a keyboard or the like.

In a case where the user inputs a connection destination and token information, the CPU 111 uses the token information input to the token information input field 1711 to request the message application server 300 to transmit channel list information of a workspace associated with the token information. Further, the CPU 111 requests the message application server 300 to transmit an icon image of each channel.

In a case where acquisition of the channel list information is completed, a channel can be selected from a channel selection field 1720 of the setting registration screen 1701. The channel selection field 1720 has a pull-down menu, and in a case where the channel selection field 1720 is selected, a list of channels represented by a plurality of pieces of channel information included in the channel list information requested to the message application server 300 by the above-described processing is displayed.

The user selects a channel where the user intends to display scanned image data from the list of channels displayed thereon.

When the CPU 111 detects that a channel is set to the channel selection field 1720 or detects that a channel set thereto is changed, the CPU 111 acquires a list of users who belong to the channel set to the channel selection field 1720, who can be specified as the mention users, from the channel information. In a case where a list of mention users is acquired from the channel information, a mention target user can be selected from the mention user selection field 1721. With this configuration, the user does not have to search a list of users including users belonging to a different channel for a desired user, whereby time and effort of the user can be reduced.

The user selects a mention target user from a list of mention users displayed on the mention user selection field 1721. The user can select a plurality of users as the mention users. In this case, pieces of user information about the selected users are transmitted in step S909.

In the present exemplary embodiment, a mention user is selected from the mention user selection field 1721 which displays users belonging to the channel selected from the channel selection field 1720. However, the configuration is not limited thereto, and a user who does not belong to the channel selected from the channel selection field 1720 may be selected. Specifically, even in a case where a channel is selected from the channel selection field 1720, the setting registration screen 1701 may include an additional selection field which allows the user to select a user belonging to a workspace associated with token information input to the token information input field 1711. In this way, a user who participates in the channel after image data has been posted can also be specified as a mention user.

In addition to the mention user setting, the mention setting can also be set or changed using the mention user selection field 1721. For example, when the user selects the mention user selection field 1721 to display the pull-down menu, options "each time mention" and "without mention" are displayed together with a list of users belonging to the channel selected in the channel selection field 1720. The fixed mention mode is internally set in a case where a specific user is selected from the list of users. In a case where the scan-to-chat button 602 is selected in a state where the mode is set to the fixed mention mode, the scan-to-chat processing can be executed without asking the user to select a mention target user.

In a case where the mention mode is set to the each time mention mode, the user is asked to select a mention target user every time the scan-to-chat button 602 is selected.

In the without-mention mode, the user information is not transmitted to the message application server 300 because a mention target user is not selected even in a case where the scan-to-chat button 602 is selected.

A setting of the mention user selection field 1721 can be skipped. Therefore, in a case where setting thereof is not performed, the scan-to-chat may be executed in the each time mention mode.

An icon image registered in the channel set in the channel selection field 1720 is displayed on an icon image display field 1730. The icon displayed on the icon image display field 1730 is displayed as an icon of the scan-to-chat button 602 in a case where the scan-to-chat button 602 is registered in the home screen 608. A predetermined image may be displayed when an icon is not registered in the channel.

A letter string that is to be displayed as a name of the scan-to-chat button 602 in a case where the scan-to-chat button 602 is registered for the home screen 608 is input to a button name setting field 1731. In the example illustrated in FIG. 17, the scan-to-chat button 602 is registered as a name "TeamA" in the home screen 608.

A setting of a comment that is to be transmitted together with scanned image data can be selected from a fixed phrase mode selection field 1732. For example, as one option, "selection mode" which allows the user to select a fixed phrase previously set in the fixed phrase setting field 1733 at the time of execution of the scan-to-chat is displayed on the fixed phrase mode selection field 1732. Further, "fixed mode" and "without comment mode" are also displayed as options. In the fixed mode, a fixed phrase previously set in the fixed phrase setting field 1733 is regularly transmitted. In the without comment mode, image data is transmitted without a comment.

The scan setting can also be performed on the setting registration screen 1701. The user can select whether to scan two sides or one side of a document in a two-sides setting field 1740. The user can select "one side" or "two sides" from a pull-down menu by selecting the two-sides setting field 1740.

The user can select whether to scan a document in color or black and white in a color setting field 1741. The user can select "color" or "black and white" from a pull-down menu by selecting the color setting field 1741.

The user presses a setting button 1705 to confirm the setting after performing setting on the setting registration screen 1701. A setting value set in the setting registration screen 1701 is stored in the storage 114. In the second exemplary embodiment described below, the setting value is stored in the HDD 405.

In a case where the user presses the generate button 1506 displayed on the setting registration screen 1501, a button for executing scan-to-chat is additionally displayed on the home screen 608 according to the setting registered in the setting registration screen 1701.

As described above, the user can register a channel as a posting destination, a notification destination user, the scan setting, and the like in association with the scan-to-chat button 602.

Figure 7:
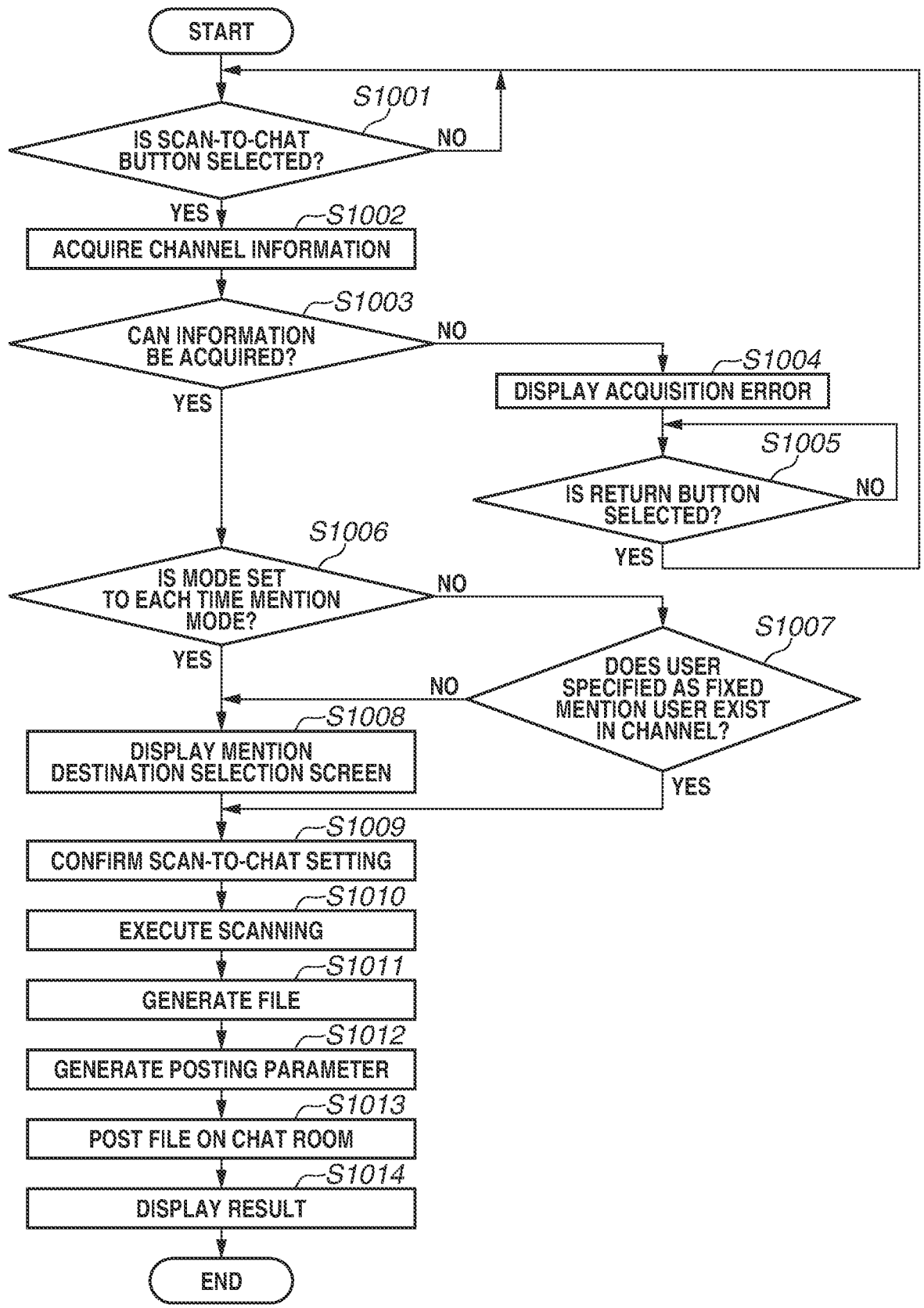
FIG. 7 is a flowchart illustrating an example of scan-to-chat processing executed by the MFP.

FIG. 7 is a flowchart illustrating an example of the scan-to-chat processing executed by the MFP 101. The processing illustrated in the flowchart in FIG. 7 is executed by the CPU 111 executing a program that is stored in the ROM 112 and read to the RAM 113. The processing procedure in FIG. 7 is started when the power of the MFP 101 is turned on.

In step S1001, the CPU 111 determines whether the scan-to-chat button 602 is selected. In a case where the CPU 111 determines that the scan-to-chat button 602 is selected (YES in step S1001), the processing proceeds to step S1002. In a case where the CPU 111 determines that the scan-to-chat button 602 is not selected (NO in step S1001), the processing returns to step S1001.

In step S1002, the CPU 111 executes processing for transmitting information about a request of channel information to the message application server 300 using HTTP communication by using the pre-registered token information 1503.

In step S1003, the CPU 111 determines whether the channel information is received from the message application server 300 in response to the channel information acquisition request transmitted in step S1002. Specifically, the CPU 111 determines that the channel information is not received in a case where an error is indicated by a status code received in response to the request transmitted using HTTP communication or the body information of the response includes a parameter that indicates the information cannot be acquired. In a case where the CPU 111 determines that the channel information is received (YES in step S1003), the processing proceeds to step S1006. In a case where the CPU 111 determines that the channel information is not received (NO in step S1003), the processing proceeds to step S1004.

In step S1004, the CPU 111 displays information indicating that the channel information cannot be acquired on the operation unit 116.

In step S1005, the CPU 111 determines whether a return button 715 is selected. In a case where the CPU 111 determines that the return button 715 is selected (YES in step S1005), the processing returns to step S1001. In a case where the CPU 111 determines that the return button 715 is not selected (NO in step S1005), the processing returns to step S1005.

In step S1006, the CPU 111 determines whether operation of the scan-to-chat is set to the each time mention mode. In a case where the operation is set to the each time mention mode (YES in step S1006), the processing proceeds to step S1008. In a case where the operation is not set to the each time mention mode (NO in step S1006), the CPU 111 determines that the operation of the scan-to-chat is set to the fixed mention mode, and the processing proceeds to step S1007.

In step S1007, with reference to the channel list information, the CPU 111 determines whether a user specified as a mention target in the mention user selection field 1721 in FIG. 17 exists in the channel selected from the channel selection field 1720. Specifically, the CPU 111 determines whether the user information coinciding with the user information of the user specified as a mention target is included in the pieces of user information in the channel information that is included in the channel list information selected in the channel selection field 1720.

In a case where the CPU 111 determines that the user specified as a mention target exists in the selected channel (YES in step S1007), the processing proceeds to step S1009. In a case where the CPU 111 determines that the user specified as a mention target does not exist in the selected channel (NO in step S1007), the processing proceeds to step S1008. The processing also proceeds to step S1009 in a case where "without mention" is selected in the mention user selection field 1721.

In the present exemplary embodiment, in a case where the CPU 111 determines that a mention target user does not belong to the selected channel, a mention user is selected by the user. However, the configuration is not limited thereto. For example, in a case where the CPU 111 determines that the mention target user (i.e., a notification destination user) does not belong to the selected channel, the CPU 111 may automatically set the mention user as "no user" without receiving the user operation. In this case, user information is not transmitted when image data is transmitted. In other words, user information of the notification destination user registered in association with the scan-to-chat button 602 is not transmitted to the chat server.

In step S1008, the CPU 111 displays the mention destination selection screen 714 of FIG. 15A on the touch panel 601 of the operation unit 116.

FIG. 15A is a diagram illustrating an example of shifting of screens in the scan-to-chat processing. In response to selection of the scan-to-chat button 602 displayed on the home screen 608, the mention destination selection screen 714 is displayed on the touch panel 601 of the operation unit 116.

First, shifting of screens in a case where the operation of the scan-to-chat is set to the each time mention mode will be described. In a case where the set mention user does not exist in a specified channel (i.e., in a case where the user information does not coincide with any one of the pieces of user information included in the channel information) when the mode is set to the fixed mention mode, the screens are also shifted in a same way as in the each time mention mode. In a case where the scan-to-chat button 602 is selected in a state where the mode is set to the each time mention mode, the mention destination selection screen 714 is displayed. A list of mention users which can be specified by the user as mention target users when scanned image data is posted on the channel is displayed on the mention destination selection screen 714. In addition to a mention destination for one user, a mention destination for all of users belonging to the channel (e.g., "@ALL") and "without mention destination" may be displayed on the mention destination selection screen 714 as the options. The user selects a mention target user and presses an OK button 713 to confirm the setting of the mention destination.

In a case where the OK button 731 is selected, a comment selection screen 720 is displayed subsequently. A comment to be attached to the scanned image data to be posted on the channel is displayed on the comment selection screen 720. The user can set the options of fixed phrases displayed on the comment selection screen 720 using the fixed phrase setting field 1733. Further, an option which allows the user not to attach a comment (e.g., "Without Comment") may also be displayed on the comment selection screen 720. The user selects a desired comment and presses an OK button 721 to confirm the comment.

When the OK button 721 is selected, a scan-to-chat setting confirmation screen 730 is displayed subsequently. A setting of the mention user and a letter string of the comment are displayed on the scan-to-chat setting confirmation screen 730. Scanning of the document is started when the user presses the OK button 731 after confirming the setting. Then, the scanned image data is transmitted, and a transmission screen 740 is displayed.

In a case where the return button 715 is selected, the scan-to-chat processing is cancelled, and the screen returns to the home screen 608.

Next, shifting of screens in a case where the operation of the scan-to-chat is set to the fixed mention mode will be described. In a case where the scan-to-chat button 602 is selected in a state where the operation is set to the fixed mention mode, a scan-to-chat setting confirmation screen 750 is displayed. A mention user and a comment (fixed phrase) set in FIG. 17 are displayed on the scan-to-chat setting confirmation screen 750.

Scanning of the document is started in a case where an OK button 751 displayed on the scan-to-chat setting confirmation screen 750 is selected. Then, the scanned image data is transmitted, and the transmission screen 740 is displayed.

Next, shifting of screens in a case where the operation of the scan-to-chat is set to the without mention mode will be described. A scan-to-chat setting confirmation screen 760 is displayed in a case where the scan-to-chat button 602 is selected in a state where the operation of the scan-to-chat is set to the without mention mode. While the example of the scan-to-chat setting confirmation screen 760 illustrates a state where both of the comment and the mention user are not set thereto, the comment can be set without setting the mention user.

Scanning of the document is started in a case where an OK button 761 displayed on the scan-to-chat setting confirmation screen 760 is selected. Then, the scanned image data is transmitted, and the transmission screen 740 is displayed.

Information indicating a channel as a posting destination may also be displayed on each of the scan-to-chat setting confirmation screens 730, 740, and 750.

In the present exemplary embodiment, scanning of the document is started in response to the user selecting the OK button 731, 751, or 761 after selecting the scan-to-chat button 602, and image data generated by the scanning is transmitted. However, the configuration is not limited to the above. The configuration may be such that scanning of the document is started and image data generated by the scanning is transmitted without receiving the user operation in a case where the scan-to-chat button 602 is selected. In this case, during scanning of the document, a screen including pieces of information about a posting destination channel, a notification destination user, and a comment may be displayed. A cancel button is also displayed on the screen, so that scanning of the document and transmission of the image data can be cancelled in a case where the user checks the above-described information and finds any deficiency.

Figure 15B:
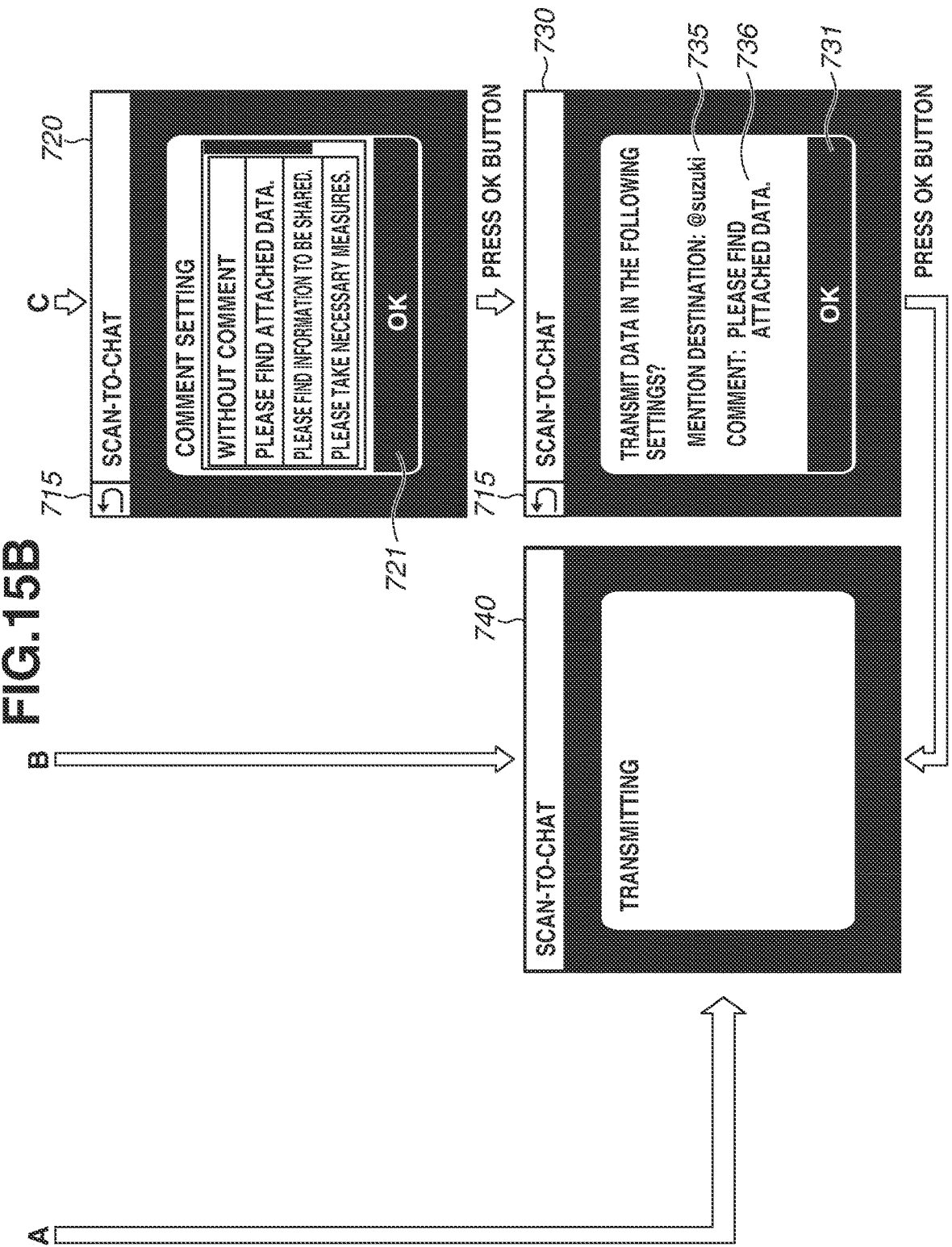

Referring back to FIG. 7, in step S1009, the CPU 111 displays the scan-to-chat setting confirmation screen 730 in FIG. 15B on the operation unit 116 (the scan-to-chat setting confirmation screen 750 is displayed in a case where the mode is the fixed mention mode, and the scan-to-chat setting confirmation screen 760 is displayed in a case where the mode is the without mention mode). In step S1009, in a case where the CPU 111 detects that all of the scan-to-chat settings, e.g., the setting of a mention target user and the setting of the comment selection screen, have been confirmed, the processing proceeds to step S1010. Specifically, the CPU 111 detects whether the OK button 731 is selected from the scan-to-chat setting confirmation screen 730. The CPU 111 detects whether the OK button 751 is selected in the scan-to-chat setting confirmation screen 750 when the mode is the fixed mention mode, and detects whether the OK button 761 is selected in the scan-to-chat setting confirmation screen 760 when the mode is the without mention mode.

In step S1010, the CPU 111 controls the reading unit 118 based on the scan setting, reads an image of the document, and generates image data. The scan setting which has been specified by the user on the scan-to-chat detailed setting screen (not illustrated) is used.

In step S1011, the CPU 111 converts the image data generated in step S1010 into image data of a format set on a transmission setting screen.

In step S1012, the CPU 111 generates a posting parameter. The posting parameter contains information about a posting destination channel, a file format, a file name, mention information, and a posting comment. A file format corresponding to the file format set in the transmission setting screen is set thereto. A character string consisting of a notification-target user name prefixed with an at mark "@" is generated as the mention information. The file name specified in the transmission setting screen is specified as the file name. Herein, user information of the mention user set in the setting registration screen 1701 in FIG. 17 or user information of the mention user selected from the mention destination selection screen 714 in FIG. 15A is transmitted as the mention information.

In step S1013, the CPU 111 uses the pre-registered token information 1503 to transmit the file and the posting parameter generated in steps S1011 and S1012 to the message application server 300 using a POST method of HTTP communication. In response to the above data (i.e., a file of converted image data and a posting parameter) transmitted to the message application server 300, the message application server 300 executes control of posting the received file to the user indicated by the received information, who belongs to the channel indicated by the received information.

In step S1014, the CPU 111 receives a posting result from the message application server 300 and displays the result on the touch panel 601 of the operation unit 116. According to the present exemplary embodiment, the user can easily post a file on a channel of the message application server 300 from the MFP 101.

In the present exemplary embodiment, the processing has been described taking a case where only a piece of token information is registered. In a case where a plurality of pieces of token information is registered, the processing relating to the token information, i.e., the processing in steps S1002, S1003, and S1013, is executed by the number of times corresponding to the number of pieces of registered token information.

Next, an example of the screen that is displayed on the operation panel 201 of the mobile terminal 200 in response to image data or a posting parameter transmitted to the message application server 300 will be described with reference to FIG. 12.

Figure 12:
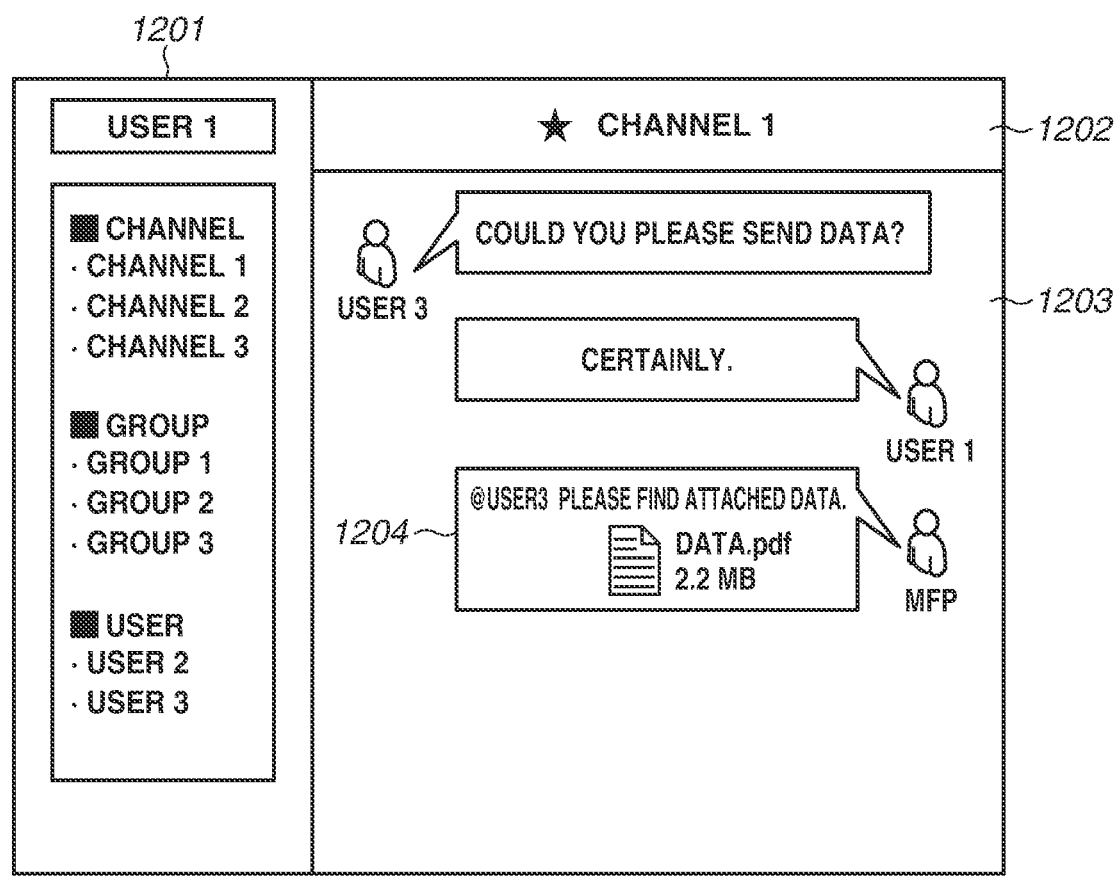
FIG. 12 is a diagram illustrating an example of a message screen of a message application.

FIG. 12 is a diagram illustrating an example of a message screen of the message application. A message application screen 1201 in FIG. 12 is displayed when the message application is started by the mobile terminal 200, and the processing in step S1013 is executed by the MFP 101. The mobile terminal 200 communicates with the message application server 300.

When the user starts the message application on the mobile terminal 200 to log in by inputting an user account ID and a password, a screen dedicated to the user is displayed.

A comment 1204 is displayed (posted) when a user having an account of the user 1 transmits image data generated by scanning an image using the MFP 101 and a posting parameter to the message application server 300. In the example in FIG. 12, among posting parameters, "CHANNEL 1" is specified as a posting destination channel, and "USER 3" is specified as a user belonging to the channel 1. Further, "DATA.pdf" is specified as a file name of the posting parameter, and "PLEASE FIND ATTACHED DATA." is specified as a comment.

A channel where the log-in user participates, a group, and a user are displayed on the message application screen 1201. Information about other users 1202 and content of exchanged messages 1203 are also displayed thereon. A comment 1204 is posted together with the user name prefixed with an at mark "@". This indicates that the posted comment 1204 is particularly intended for a specific user in the channel. In the example in FIG. 12, by operating the terminal for executing the message application, the user 3 can easily notice that the posting is intended for the user 3 because the own user name is described in the comment 1204. In a case where the mobile terminal 200 which is used by the user 3 to browse a comment is a smartphone, the user 3 is notified of the posting by an icon notification function, vibrations, or an incoming message alert. In a case where the mobile terminal 200 which is used by the user 3 to browse a comment is a desktop terminal, the user 3 is notified of the posting by a desktop notification function. When this screen is to be displayed, the message application server 300 searches the data structure in FIG. 11 for necessary information to display the screen. For example, the comment 1204 posted thereon corresponds to "Comment 3+File 1" in a content 505 of exchanged comments, and attribute information, such as the name of the file 1 is acquired from a file 504 and displayed on the message in a form of a file icon. The user can acquire the file 1 belonging to the file 504 by selecting this file icon. In this example, while the file posted on the channel is displayed in a form of an icon, a preview image of the file may be displayed instead of the icon.

Figure 11:
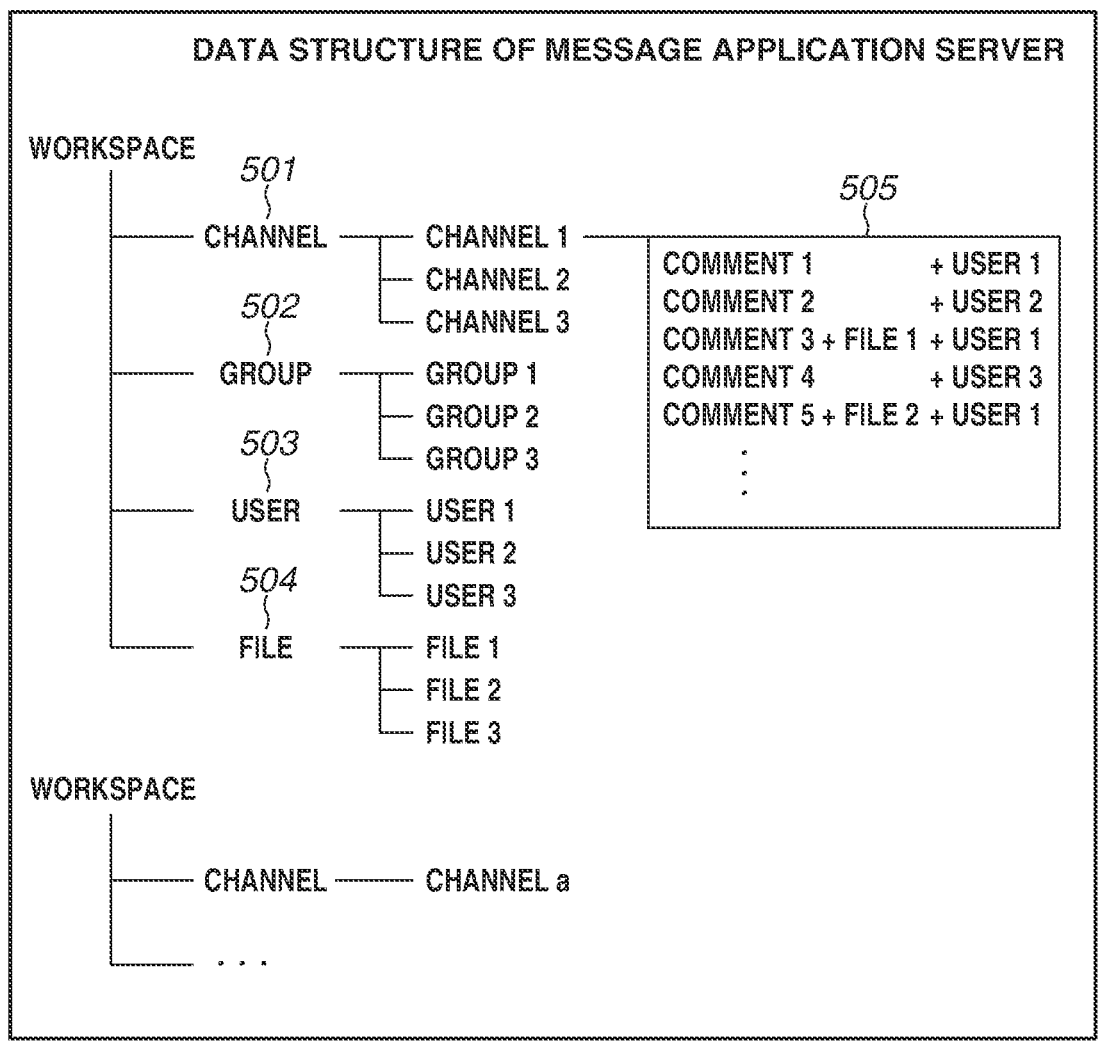
FIG. 11 is a diagram illustrating an example of a file structure in the message application server.

FIG. 11 is a diagram illustrating an example of a file structure within the message application server 300. This file structure is stored in the HDD 305 of the message application server 300, and the screen in FIG. 12 is displayed based on this file structure. The message application server 300 has small categories, such as "channel", "group", "user", and "file" included in a largest category called "workspace", and data is managed by these categories. A channel 501 is a chatroom where all of members of the workspace can participate in, and content of information posted thereon is searchable by anybody. A group 502 is a channel that is used for holding a discussion that is disclosed to not all of the members, and a member needs to have an invitation in order to browse or participate in the group 502. A user 503 is a user who participates in this workspace. An attached file is saved in the file 504. Further, content 505 exchanged in the channel or the group, or exchanged between the users is stored in association therewith. For example, a user participating in the channel 1 is stored in association with the channel 1, and messages and image data exchanged in the channel 1 are also stored in association with the channel 1. Because the information is stored in the above-described state, a list of mention users corresponding to the specified channel information can be displayed on the mention user selection field 1721 when the channel is selected from the channel selection field 1720 in FIG. 17.

In the first exemplary embodiment, the MFP 101 directly transmits image data and a posting parameter to the message application server 300. In the second exemplary embodiment, the MFP 101 transmits image data and a posting parameter to the message application server 300 via the bot server 400.

Figure 8:
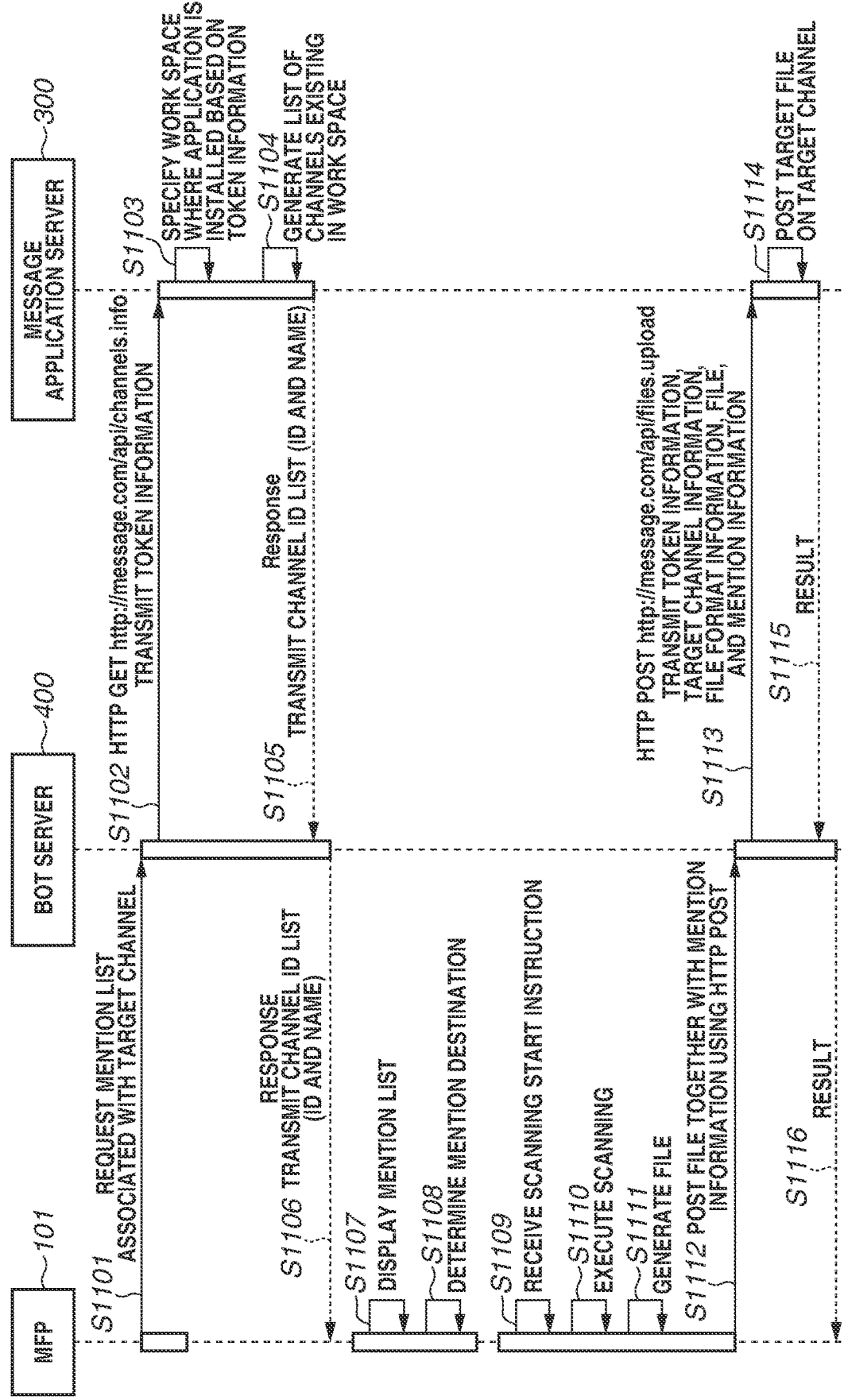
FIG. 8 is a sequence diagram illustrating an example of processing for transmitting a file generated by the MFP scanning a document to the message application server via the bot server.

FIG. 8 is a sequence diagram illustrating an example of processing for transmitting a file generated by the MFP 101 by scanning to the message application server 300 via the bot server 400.

In step S1101, the CPU 111 of the MFP 101 uses the device ID or the user ID as a parameter to transmit an acquisition request of channel list information to the bot server 400 using HTTP communication.

In step S1102, the CPU 401 of the bot server 400 uses the token information associated with the received device ID or the user ID to transmit information indicating the acquisition request of channel list information to the message application server 300 using HTTP communication. The token information associated with the device ID or the user ID received in step S1101 is acquired.

FIG. 16 is a table illustrating an example of association between the ID and the token information. In the table of FIG. 16, a user ID or a device ID and authentication information (token information) are registered in association with each other. This table is stored in the HDD 405 of the bot server 400. The user ID and the device ID are information stored in the MFP 101. The user ID is user identification information set for each user who uses the MFP 101. The device ID is device identification information set for each MFP. The user ID is identification information set by the user when a user account used for logging in the MFP 101 is generated. The device ID is identification information uniquely set to the MFP 101 at the time of factory shipment.

In step S1103, based on the token information, the CPU 301 of the message application server 300 searches for the registered workspace information and the bot application.

In step S1104, the CPU 301 of the message application server 300 checks whether access to the URL executed based on the application information is permitted. In a case where the access is permitted, the CPU 301 generates information about a list of channels belonging to the work space. The information about a list of channels is information about an array of channel information. The channel information includes a channel ID, a name of the channel, information about users participating in that channel who can be specified as mention users (i.e., information about a list of mention users), and a channel setting value indicating whether the channel is an archive channel.

In step S1105, in response to the request received using HTTP communication, the CPU 301 of the message application server 300 controls the communication unit 304 to transmit channel list information to the bot server 400.

In step S1106, in response to the request received using HTTP communication, the CPU 401 of the bot server 400 transmits the channel list information received in step S1105 to the MFP 101.

Figure 9:
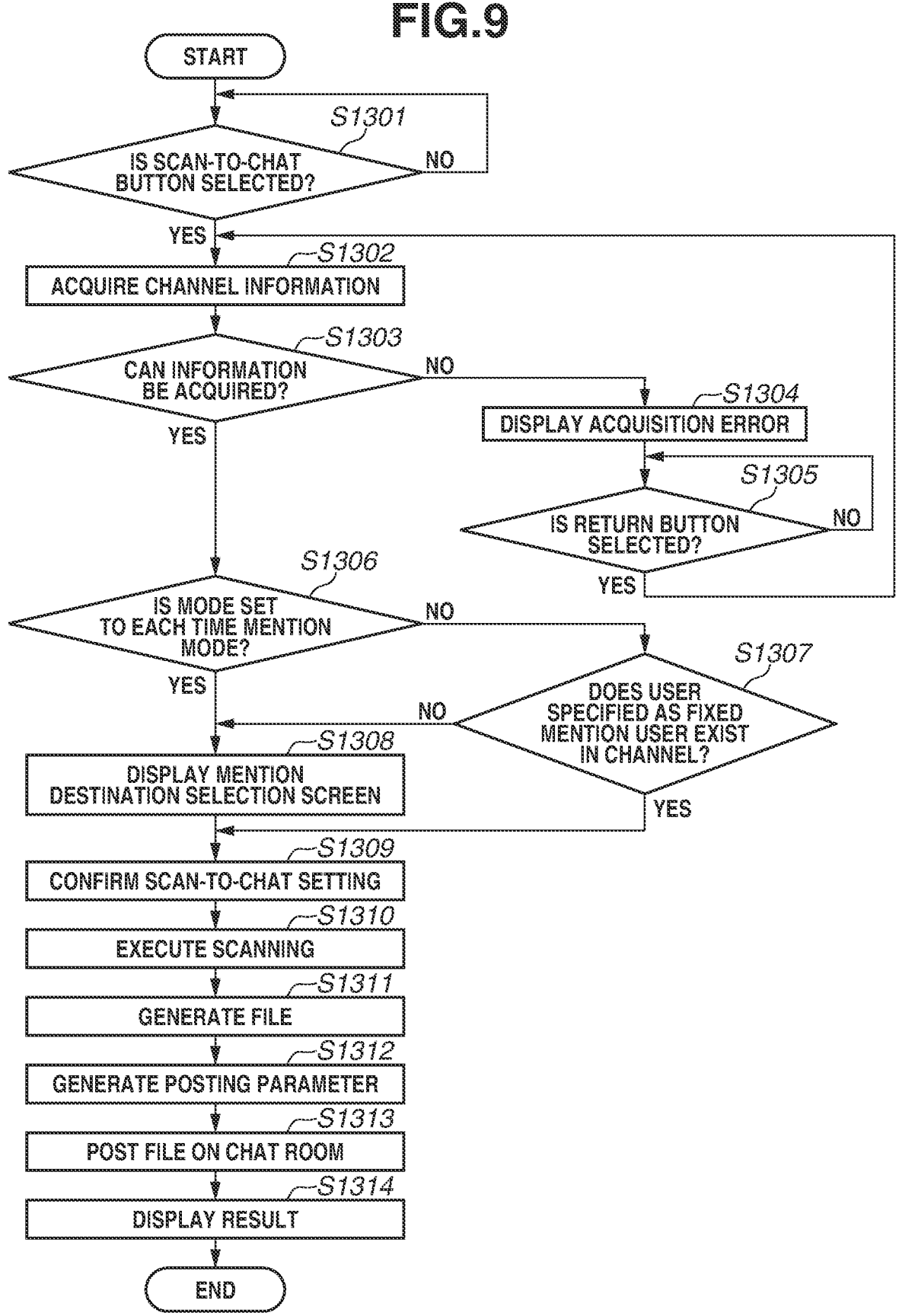
FIG. 9 is a flowchart illustrating an example of the scan-to-chat processing.

Since the processing in steps S1107 to S1111 is similar to the processing in steps S905 to S909 in FIG. 9, redundant description thereof will be omitted.

In step S1112, the CPU 111 of the MFP 101 transmits the device ID or the user ID, information about a posting destination channel, information indicating a file format, image data, and mention information to the bot server 400 using HTTP communication.

In step S1113, the CPU 401 of the bot server 400 executes processing for transmitting the received information about a posting destination channel, the information indicating a file format, the image data, and the mention information to the message application server 300. The CPU 401 also transmits token information associated with the received device ID or the user ID to the message application server 300. The CPU 401 refers to the table stored in the HDD 405 which illustrates association between the device ID or the user ID and the token information to determine the token information to be transmitted.

Since the processing in step S1114 is similar to the processing in step S911, redundant description thereof will be omitted.

In step S1115, in response to the information received using HTTP communication, the CPU 301 of the message application server 300 transmits a result indicating success or failure in the posting to the bot server 400.

In step S1116, in response to the information received using HTTP communication, the CPU 401 of the bot server 400 transmits the result indicating success or failure in the posting to the MFP 101. The CPU 111 of the MFP 101 may display a notification indicating success in the posting on the operation unit 116 in a case where the posting has succeeded. The CPU 111 of the MFP 101 may display a notification indicating failure in the posting on the operation unit 116 in a case where the posting has failed. Alternatively, the CPU 111 may display a notification indicating failure in a case where the posting has failed, and may display no notification in a case where the posting has succeeded.

While the channel list is acquired in the present exemplary embodiment, a list of limited-access groups and a list of individual-posting users can also be acquired using a similar method.

FIG. 9 is a flowchart illustrating an example of the scan-to-chat processing. The processing illustrated in the flowchart in FIG. 9 is executed when the CPU 111 reads a program stored in the ROM 112 to the RAM 113 and executes the program. The processing procedure in FIG. 9 is started in a case where the power of the MFP 101 is turned on.

Since the processing in step S1301 is similar to the processing in step S1001, redundant description thereof will be omitted.

In step S1302, the CPU 111 acquires a user ID of a user logging in the MFP 101 or a device ID of the MFP 101 and transmits a channel information acquisition request and the user ID or the device ID to the bot server 400.

Since the processing in steps S1303 to S1312 is similar to the processing in steps S1003 to S1012, redundant description thereof will be omitted.

In step S1313, the CPU 111 transmits the user ID of the user logging in the MFP 101 or the device ID of the MFP 101, the file generated in step S1311, and the posting parameter. In the first exemplary embodiment, while the file is transmitted to the message application server 300 by using the pre-registered token information, the configuration is not limited thereto. For example, the configuration may be such that the user ID or the deice ID and the token information in FIG. 16 are stored in the storage 114 of the MFP 101 in association with each other, and a request or a file is transmitted by using the token information associated with the user ID of the log-in user or the device ID.

Further, in the present exemplary embodiment, while the user ID of the log-in user or the device ID is used for communicating with the bot server 400, a tenant ID can also be used as long as the ID is a uniquely-determined identifier.

Figure 10:
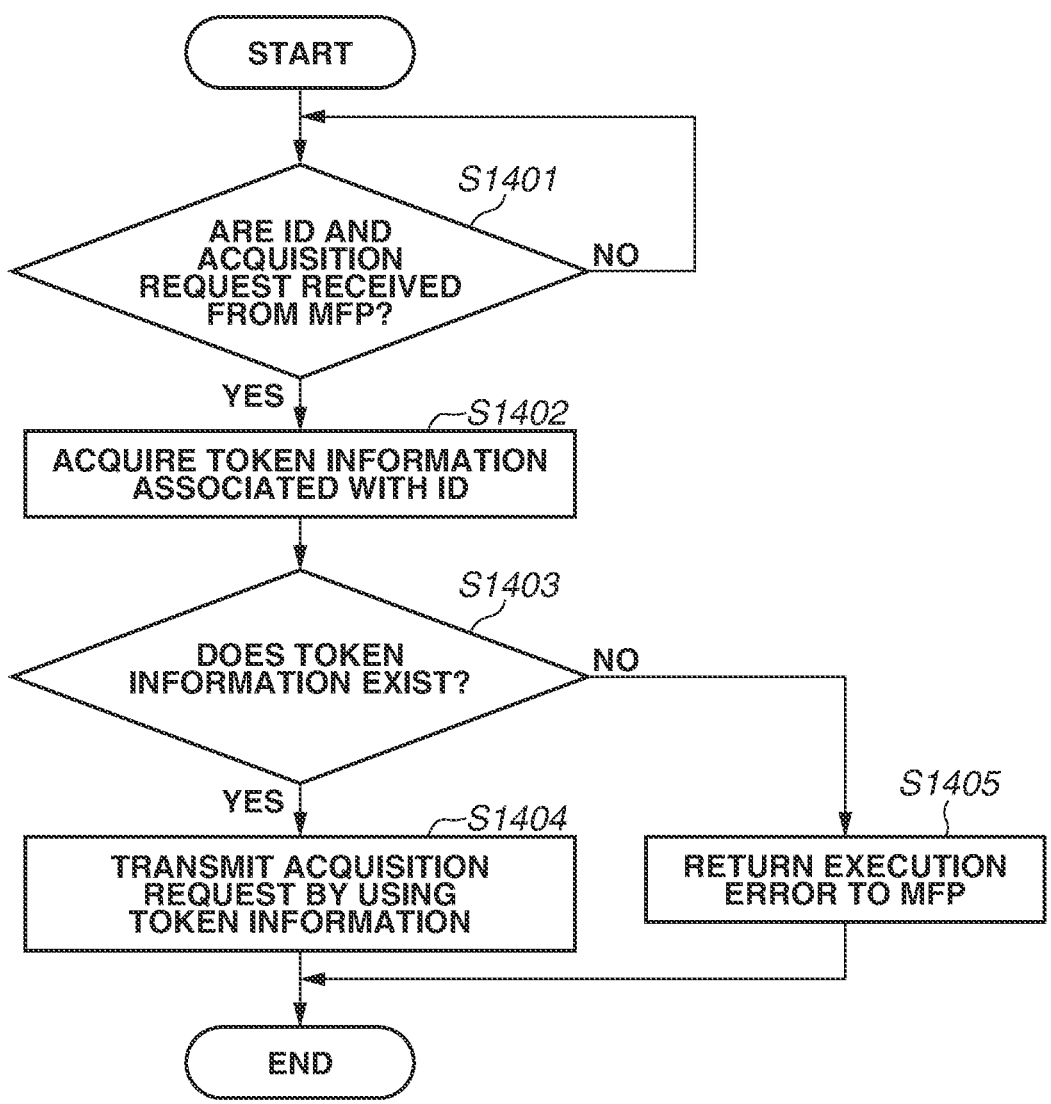
FIG. 10 is a flowchart illustrating an example of processing for transmitting image data to the message application server by the bot server.

FIG. 10 is a flowchart illustrating an example of processing that is executed when the bot server 400 transmits image data to the message application server 300. The processing illustrated in the flowchart in FIG. 10 is executed when the CPU 401 reads a program stored in the ROM 402 to the RAM 403 and executes the program. The processing flow in FIG. 10 is started when the power of the MFP 101 is turned on.

In step S1401, the CPU 401 determines whether the device ID or the user ID and an information acquisition request for acquiring the channel information are received from the MFP 101. In a case where the CPU 401 determines that the ID and the request are received (YES in step S1401), the processing proceeds to step S1402. In a case where the CPU 401 determines that the ID and the request are not received (NO in step S1401), the processing returns to step S1401.

In step S1402, the CPU 401 acquires token information associated with the device ID or the user ID received from the MFP 101.

In step S1403, with reference to the table in FIG. 16, the CPU 401 determines whether the token information associated with the received device ID or the user ID exists. In a case where the CPU 401 determines that the token information exists (YES in step S1403), the processing proceeds to step S1404. In a case where the CPU 401 determines that the token information does not exist (NO in step S1403), the processing proceeds to step S1405. In a case where the CPU 401 determines that the token information exists, the token information associated with the received device ID or the user ID is stored in the RAM 403.

In step S1404, the CPU 401 transmits the information acquisition request received from the MFP 101 in step S1401 to the message application server 300 by using the token information specified in step S1403. The CPU 401 transmits the information received from the message application server 300 in response to the transmitted acquisition request to the MFP 101.

In step S1405, the CPU 401 transmits information indicating an execution error to the MFP 101 in response to the request received in step S1401.

The processing illustrated in the flowchart in FIG. 10 is executed when the CPU 401 receives the user ID or the device ID and the information acquisition request transmitted in step S1101 of the sequence diagram in FIG. 8. Processing similar to the processing in FIG. 10 is executed in a case where the CPU 401 receives the user ID or the device ID, a file (image data), and information about a posting destination channel transmitted in the processing in step S1112. In other words, in a case where the token information associated with the received device ID or the user ID exists, the CPU 401 transmits the token information, the information about a posting destination channel, and a file (image data) to the message application server 300. In a case where the token information associated with the received device ID or the user ID does not exist, the CPU 401 transmits information indicating an error to the MFP 101.

According to the present exemplary embodiment, even in a case where an interface specification of the message application server 300 is changed, the aspect of the present disclosure can be realized by simply updating the program of the bot server without uploading the program of the MFP 101. Further, in a case where a plurality of MFPs is installed in the office, posting of a file can be executed without executing token setting on each of the MFPs individually.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a controller that registers a user and a channel of a chat service in association with an object;
a communicator that transmits, based on selection of the object by a user, image data, wherein the transmitted image data is posted to the registered channel, information indicating that the transmitted image data is posted is notified to the registered user; and
a user interface that displays, based on selection of the object in which a user that is not included in the registered channel is registered, an object for selecting another user to be notified the information.

2. The information processing apparatus according to claim 1,
wherein the object for selecting another user is a screen for selecting another user.

3. The information processing apparatus according to claim 1,
wherein the controller registers the user and the channel that are selected by a user.

4. The information processing apparatus according to claim 3,
wherein the controller obtains information of a plurality of channels from the chat service, and
wherein the controller receives the selection, by the user, of the channel of the chat service from the plurality of channels based on the obtained information.

5. The information processing apparatus according to claim 1, further comprising:
a scanner that scans a document to generate image data.

6. The information processing apparatus according to claim 5, further comprising:
a printer that prints the image data generated by the scanner.

7. The information processing apparatus according to claim 1,
wherein the channel of the chat service is a chat room.

8. The information processing apparatus according to claim 5,
wherein, based on a single execution instruction, the scanner scans the document to generate the image data and then the communicator transmits the image data.

9. The information processing apparatus according to claim 1, wherein the registered user is a mentioned user.

10. The information processing apparatus according to claim 1,
wherein the communicator transmits, based on selection of the object by the user, the image data and user information of the registered user.

11. An information processing method comprising:
registering a user and a channel of a chat service in association with an object;
transmitting, based on selection of the object by a user, image data, wherein the transmitted image data is posted to the registered channel, information indicating that the transmitted image data is posted is notified to the registered user; and
displaying, based on selection of the object in which a user that is not included in the registered channel is registered, an object for selecting another user to be notified the information.

12. The information processing method according to claim 11,
wherein the object for selecting another user is a screen for selecting another user.

13. The information processing method according to claim 11,
wherein the user and the channel that are selected by a user are registered in association with the object.

14. The information processing method according to claim 13, further comprising:
obtaining information of a plurality of channels from the chat service; and
receiving the selection, by the user, of the channel of the chat service from the plurality of channels based on the obtained information.

15. The information processing method according to claim 11, further comprising:
scanning a document to generate image data.

16. The information processing method according to claim 15, further comprising:
printing the image data generated by the scanning.

17. The information processing method according to claim 11,
wherein the channel of the chat service is a chat room.

18. The information processing method according to claim 15, wherein, based on a single execution instruction, the document is scanned to generate the image data and then the image data is transmitted.

19. The information processing method according to claim 11,
wherein the registered user is a mentioned user.

20. The information processing method according to claim 11,
wherein the image data and user information of the registered user are transmitted based on selection of the object by the user.

* * * * *